United States Patent
Teyeb et al.

(10) Patent No.: US 10,517,133 B2
(45) Date of Patent: Dec. 24, 2019

(54) METHODS AND UE FOR RESUMING A CONNECTION WITH FULL CONFIGURATION

(71) Applicant: TELEFONAKTIEBOLAGET LM ERICSSON (PUBL), Stockholm (SE)

(72) Inventors: Oumer Teyeb, Solna (SE); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/380,844

(22) Filed: Apr. 10, 2019

(65) Prior Publication Data
US 2019/0254102 A1    Aug. 15, 2019

Related U.S. Application Data

(63) Continuation of application No. PCT/IB2019/050836, filed on Feb. 1, 2019.

(60) Provisional application No. 62/631,467, filed on Feb. 15, 2018.

(51) Int. Cl.
*H04W 76/19* (2018.01)

(52) U.S. Cl.
CPC .................. *H04W 76/19* (2018.02)

(58) Field of Classification Search
None
See application file for complete search history.

(56) References Cited

U.S. PATENT DOCUMENTS

| | | | | |
|---|---|---|---|---|
| 2013/0039339 A1* | 2/2013 | Rayavarapu | .......... | H04W 76/19 370/331 |
| 2013/0260740 A1* | 10/2013 | Rayavarapu | .......... | H04W 76/27 455/422.1 |
| 2013/0260810 A1* | 10/2013 | Rayavarapu | .......... | H04W 76/19 455/509 |
| 2013/0260811 A1* | 10/2013 | Rayavarapu | .......... | H04W 76/19 455/509 |
| 2015/0117286 A1* | 4/2015 | Kim | .................. | H04W 52/0216 370/311 |
| 2015/0131540 A1* | 5/2015 | Koo | ...................... | H04W 76/14 370/329 |

(Continued)

OTHER PUBLICATIONS

3GPP TS 36.331 V15.0.1 (Jan. 2018), 3rd Generation Partnership Project; Technical Specification Group Radio Access Network; Evolved Universal Terrestrial Radio Access (E-UTRA); Radio Resource Control (RRC); Protocol specification (Release 15), pp. 1-776.

(Continued)

*Primary Examiner* — Otis L Thompson, Jr.

(57) ABSTRACT

A wireless device for resuming a connection in a communication network. The wireless device comprises a communication interface; and one or more processing circuits communicatively connected to the communication interface, the one or more processing circuits comprising at least one processor and memory, the memory containing instructions that, when executed, cause the at least one processor to: send to a network node a request to resume a connection in a communication network; receive a resume response message from the network node, the message comprising an indication to perform a full configuration; and apply the full configuration.

20 Claims, 17 Drawing Sheets

(56) References Cited

U.S. PATENT DOCUMENTS

| | | | |
|---|---|---|---|
| 2015/0181461 A1* | 6/2015 | Kim | H04W 74/08 |
| | | | 370/236 |
| 2017/0188269 A1* | 6/2017 | Sunel | H04W 8/22 |
| 2017/0311206 A1* | 10/2017 | Ryoo | H04W 24/08 |
| 2018/0049255 A1* | 2/2018 | Chen | H04W 76/12 |
| 2018/0091968 A1* | 3/2018 | Ly | H04L 43/16 |
| 2018/0213452 A1* | 7/2018 | Kim | H04W 36/0033 |
| 2018/0234941 A1* | 8/2018 | Kim | H04W 68/005 |
| 2018/0270741 A1* | 9/2018 | Enomoto | H04W 36/12 |
| 2018/0279204 A1* | 9/2018 | Kim | H04W 48/02 |
| 2018/0359149 A1* | 12/2018 | Shaheen | H04L 5/0092 |
| 2019/0037635 A1* | 1/2019 | Guo | H04W 76/27 |
| 2019/0053102 A1* | 2/2019 | Oohira | H04W 8/06 |
| 2019/0053199 A1* | 2/2019 | Fujishiro | H04W 72/04 |
| 2019/0124572 A1* | 4/2019 | Park | H04W 76/27 |
| 2019/0215800 A1* | 7/2019 | Fujishiro | H04W 8/08 |
| 2019/0215887 A1* | 7/2019 | Burbidge | H04W 48/14 |
| 2019/0254074 A1* | 8/2019 | Jeon | H04W 36/0069 |

OTHER PUBLICATIONS

Ericsson, Offline#22 LTE re-establishment and resume while using NR PDCP, 3GPP TSG-RAN WG2 Meeting #100, Reno, US, Nov. 27-Dec. 1, 2017, pp. 1-12.

\* cited by examiner

METHODS AND UE FOR RESUMING A CONNECTION WITH FULL CONFIGURATION

RELATED APPLICATIONS

The present application is a continuation of International Application Ser. No. PCT/IB2019/050836, filed Feb. 1, 2019, entitled "Methods and UE for resuming a connection with full configuration" which claims priority to and the benefit of the filing of U.S. Provisional Patent Application No. 62/631,467, entitled "RRC Resume with Full Configuration", and filed at the United States Patent and Trademark Office on Feb. 15, 2018, all of which are incorporated herein by reference in their entireties.

TECHNICAL FIELD

The present description generally relates to wireless communications and, more particularly, to resume a connection for a wireless device.

BACKGROUND

Radio Resource Control (RRC) Protocol

As in Long Term Evolution (LTE), the Radio Resource Control (RRC) protocol is used to configure/setup and maintain the radio connection between the User Equipment (UE) and the network node (e.g. eNB). When the UE receives an RRC message from the eNB, it will apply the configuration (the term "compile" can be also used to refer to the application of the configuration). And if this succeeds, the UE generates an RRC complete message that indicates the transaction identity (ID) of the message that triggered this response.

Since LTE-release (rel.) 8, three Signaling Radio Bearers (SRBs), namely SRB0, SRB1and SRB2have been available for the transport of RRC and Non Access Stratum (NAS) messages between the User Equipment (UE) and eNB. A new SRB, known as SRB1bis, was also introduced in rel-13 for supporting DoNAS (Data Over NAS) in Narrowband Internet of Things (NB-IoT).

SRB0 is used for RRC messages using the Common Control Channel (CCCH) logical channel, and it is used for handling RRC connection setup, RRC connection resume and RRC connection re-establishment. Once the UE is connected to the eNB (i.e. RRC connection setup or RRC connection reestablishment/resume has succeeded), SRB1 is used for handling RRC messages (which may include a piggybacked NAS message) as well as for NAS messages prior to the establishment of SRB2, all using Dedicated Control Channel (DCCH) logical channel.

SRB2 is used for RRC messages which include logged measurement information and for NAS messages, all using DCCH logical channel. SRB2 has a lower priority than SRB1, because logged measurement information and NAS messages can be lengthy and could cause the blocking of more urgent and smaller SRB1 messages. SRB2 is always configured by Evolved-Universal Mobile Telecommunications Service (UMTS) Terrestrial Radio Access Network (E-UTRAN) after security activation.

Dual Connectivity (DC) in LTE

Evolved-UMTS Terrestrial Radio Access Network (E-UTRAN) supports Dual Connectivity (DC) operation whereby a multiple Receive/Transmit (Rx/Tx) UE in RRC_CONNECTED is configured to utilize radio resources provided by two distinct schedulers, located in two eNBs connected via a non-ideal backhaul over the X2 interface (see 3GPP 36.300). eNBs involved in DC for a certain UE may assume two different roles: an eNB may either act as an Master node (MN) or as an Secondary node (SN). In DC, a UE is connected to one MN and one SN.

In LTE DC, the radio protocol architecture that a particular bearer uses depends on how the bearer is setup. Three bearer types exist: Master Cell Group (MCG) bearer, Secondary Cell Group (SCG) bearer and split bearers. RRC is located in MN and SRBs are always configured as a MCG bearer type and therefore only use the radio resources of the MN. FIG. 1 illustrates the LTE DC User Plane (UP), with the 3 types of bearers in a UE.

LTE-NR Dual Connectivity

LTE-NR (LTE-New Radio) DC (also referred to as LTE-NR tight interworking) is currently being discussed for rel-15. In this context, the major changes from LTE DC are:
  The introduction of split bearer from the SN (known as SCG split bearer);
  The introduction of split bearer for RRC;
  The introduction of a direct RRC from the SN (also referred to as SCG SRB).

FIGS. 2 and 3 show the UP and Control Plane (CP) architectures respectively for LTE-NR tight interworking.

The SN is sometimes referred to as SgNB (where gNB is an NR base station), and the MN as MeNB in case the LTE is the master node and NR is the secondary node. In the other case where NR is the master and LTE is the secondary node, the corresponding terms are SeNB and MgNB.

Split RRC messages are mainly used for creating diversity, and the sender can decide to either choose one of the links for scheduling the RRC messages, or it can duplicate the message over both links. In the downlink, the path switching between the MCG or SCG legs or duplication on both is left to network implementation. On the other hand, for the UL, the network configures the UE to use the MCG, SCG or both legs. The terms "leg" and "path" are used interchangeably throughout this document.

The following terminologies are used throughout this disclosure to differentiate different dual connectivity scenarios:
  DC: LTE DC (i.e. both MN and SN employ LTE);
  EN-DC: LTE-NR dual connectivity where LTE is the master and NR is the secondary;
  NE-DC: LTE-NR dual connectivity where NR is the master and LTE is the secondary;
  NR-DC (or NR-NR DC): both MN and SN employ NR;
  MR-DC (multi-RAT DC): a generic term to describe where the MN and SN employ different Radio Access Technologies (RATs), EN-DC and NE-DC are two different example cases of MR-DC.

Bearer Harmonization in EN-DC

In Radio Access Network 2 (RAN2), it has been agreed to harmonize what was former called MCG bearers, MCG split bearers, SCG bearers and SCG split bearers in the following way:
  a) It is possible to configure the UE to use NR Packet Data Convergence Protocol (PDCP) for all the bearers (even when the UE is operating in standalone LTE mode and EN-DC is not setup);

b) For all bearers configured with NR PDCP, it is possible to configure the UE to either use KeNB or S-KeNB as security key;

c) The configuration of the PDCP layers is separated from the configuration of the lower layers of the MCG and SCG leg.

From a UE point of view, this means that there are only 3 different bearers (as can be seen in FIG. 4) namely the:

d) MCG bearer which uses the radio link towards the MN node only;

e) SCG bearer which uses the radio of the SN node only;

f) And the split bearer which uses the radio of both the MN and SN.

Where these bearers are terminated in the network is not important from the UE's perspective anymore, i.e. the UE will just use the key that is being configured from each bearer. From a RAN2 point of view it is fully supported to setup MCG bearers being terminated in the SN node using S-KeNB and SCG bearers being terminated in the MN node. Similarly, it is possible to support both SN and MN terminated bearers at the same time i.e. both SN terminated split bearers and MN terminated split bearers.

LTE Re-Establishment Procedure

The purpose of the LTE re-establishment procedure is to re-establish the RRC connection upon detecting radio link failure, handover failure, mobility from E-UTRA failure, integrity check failure on SRBs or RRC connection reconfiguration failure. Re-establishment involves the resumption of SRB1, the re-activation of security and the configuration of only the Primary cell (PCell), i.e. Carrier Aggregation (CA) or DC operations are not re-established.

When the target eNB gets a re-establishment request, it identifies the source eNB/cell from the ReestabUE-Identity included in the request and can send a Radio Link Failure (RLF) Indication X2 message to the source eNB. The source eNB may respond with a Handover Request message that includes the UE context (RRC context and S1 context). If the target eNB is able to understand the UE context, re-establishment succeeds and the target eNB sends an RRCConnectionReestablishment message to the UE. If the target eNB does not receive the UE context or it doesn't understand the context, it may reject the re-establishment and the UE has to go to RRC_IDLE to re-connect. If the target eNB doesn't understand the RRC context but can understand the S1 context, it doesn't necessarily reject the re-establishment and can still respond with RRCConnectionReestablishment and later use full reconfiguration to reconfigure the bearers based on the S1 context.

In case of a re-establishment success, SRB1 operation resumes while the operation of other radio bearers (SRB2 and DRBs) remains suspended. If Access Stratum (AS) security has not been activated, the UE does not initiate the procedure but instead moves to RRC_IDLE directly.

E-UTRAN applies the re-establishment procedure as follows:

When AS security has been activated:
reconfigure SRB1 and resume data transfer only for this Radio Bearer;
re-activate AS security without changing algorithms.

After this, the UE sends the RRCConnectionReestablishmentComplete message, and the target eNB responds by sending an RRCConnectionReconfiguration message to reconfigure SRB2 and the DRBs.

The RRC connection re-establishment procedure flow is shown in FIG. 5 (success case) and FIG. 6 (failure case). SRB0 is used for sending the RRCConnectionReestablishmentRequest, RRCConnectionReestablishment and RRCConnectionReestablishementReject messages, while RRCConnectionReestablishmentComplete uses SRB1.

LTE Suspend/Resume Procedure

The RRC suspend/resume functionality has been introduced in LTE rel-13. A suspended UE can be considered to be in an intermediate state between IDLE and CONNECTED, where the UE AS context is kept both at the UE and RAN, and the UE can be seen as if it is in connected mode but suspended from the Core Network (CN) point of view and in IDLE mode from the RAN point of view. The advantage of operating in this mode is reduced signaling and faster transition to CONNECTED mode as compared to legacy IDLE-CONNECTED mode transitions, while maintaining the UE power saving advantages of IDLE mode.

When a decision is made by the network to move the UE to suspended state, the eNB sends the UE an RRCConnectionRelease message with the release cause value of rrc-suspend. The RRCConnectionRelease message also contains a Resume ID. The UE stores the Resume ID and UE AS context (including the current RRC configuration, the current security context, the PDCP state including Robust Header Compression (ROHC) state, Cell-Radio Network Temporary Identifier (C-RNTI) used in the source PCell, the cell Identity (cellID) and the physical cell identity of the source PCell); re-establishes all Radio Link Control (RLC) entities (both for SRBs and DRBs); and suspends all DRBs and SRBs except SRB0.

When the UE later on wants to resume the connection (in response to UL data to be sent or a paging request for DL data), it sends an RRCConnectionResumeRequest message with the saved Resume ID. If the resume operation is performed in an eNB other than the eNB that was serving the UE when the UE was suspended, the new eNB can perform a context fetch by using the Retrieve UE Context X2 procedure from the old eNB (as the Resume ID includes information about the old eNB/cell). Upon getting the context (if resuming on a new eNB) or if the resumption was in the same eNB, the target eNB responds with an RRCConnectionResume message, and both the UE and eNB restore the saved UE context, and data transmission/reception from/to the UE can be resumed.

The RRC connection resume procedure flow is shown in FIG. 7 (success case) and FIG. 8 (fallback to RRC connection establishment). FIG. 9 (network reject or release) shows the resume procedure in LTE. SRB0 is used for sending the RRCConnectionResumeRequest, RRCConnectionSetup and RRCConnectionReestablishementReject, while RRCConnectionResume and RRCConnectionResume Complete messages use SRB1.

The main difference between resume and re-establishment is (from a procedural perspective): SRB1 is used for the RRCConnectionResume message, while SRB0 is used for the RRCConnectionReestablishment message.

The RRCConnectionResume message, unlike the RRCConnectionReestablishement message, can contain the SRB2/DRB configuration, and thus RRCConnectionReconfiguration is not needed after resume (while it is necessary in the re-establishment case to reconfigure SRB2/DRBs).

The detailed RRC connection suspend procedure 1000 is illustrated in FIG. 10.

More specifically, in step 1010 of FIG. 10, due to some triggers, e.g. the expiry of a UE inactivity timer, the eNB decides to suspend the RRC connection.

In step 1020, the eNB initiates the S1-Application Protocol (AP) UE Context Suspend procedure to inform the Mobility Management Entity (MME) that the RRC connection is being suspended. To do so, the eNB sends a UE context Suspend Request. As a note, S1 refers to the interface between the eNB and the core network.

In step 1030, the MME requests the Serving-Gateway (S-GW) to release all S1-U bearers for the UE. The S1-U refers to the S1 user plane and the S1-U bearers are the bearers that carry user data between the eNB and the core network.

In step 1040, the MME Acknowledges step 1020. For example, the MME sends a response to the request of step 1020.

In step 1050, the eNB suspends the RRC connection by sending an RRCConnectionRelease message with the releaseCause set to rrc-Suspend, to the UE. The message includes the resumeIdentity which is stored by the UE.

In step 1060, the UE stores the AS context, suspends all SRBs and DRBs. The UE enters the RRC_IDLE light connected state.

When the UE later on wants to resume the connection (in response to UL data to be sent or a paging request for DL data), it sends an RRCConnectionResumeRequest message with the saved resumeIdentity. The eNB responds with an RRCConnectionResume message, and both the UE and eNB restore the saved UE context, and data transmission/reception from/to the UE can be resumed. Note that the resume operation can be performed in an eNB other than the eNB that was serving the UE when the UE was suspended. In that case, the new eNB can perform a context fetch e.g. by using the Retrieve UE Context procedure from the old eNB (as the resumeIdentity includes information about the old eNB/cell).

The RRC connection resume procedure in the same eNB and new eNB are illustrated in FIGS. 11 and 12, respectively.

FIG. 11 illustrates a RRC connection resume procedure 1100 in the same eNB.

In step 1110, the UE sends a Random Access Preamble to the eNB, in order to access the network.

In step 1120, the eNB replies by sending a Random Access Response, to confirm that the UE is connected to the network node (eNB).

In step 1130 of FIG. 11, at some later point in time (e.g. when the UE is being paged or when new data arrive in the uplink buffer) the UE resumes the connection by sending an RRCConnectionResumeRequest to the eNB. The UE may include its Resume ID, the establishment cause, and authentication token. The authentication token is calculated in the same way as the short Message Authentication Code-Integrity (MAC-I) used in RRC connection re-establishment and allows the eNB to verify the UE identity.

In step 1140, provided that the Resume ID exists and the authentication token is successfully validated, the eNB responds with an RRCConnectionResume. The message includes the Next Hop Chaining Count (NCC) value which is required in order to re-establish the AS security.

In step 1150, the UE resumes all SRBs and DRBs and re-establishes the AS security. The UE is now in RRC_CONNECTED.

In step 1160, the UE responds with an RRCConnectionResumeComplete confirming that the RRC connection was resumed successfully.

In step 1170, the eNB initiates the S1-AP Context Resume procedure to notify the MME about the UE state change.

In step 1180, the MME requests the S-GW to activate the S1-U bearers for the UE.

In step 1190, the MME acknowledges step 1170.

FIG. 12 illustrates the RRC resume procedure 1200 in an eNB different from the source eNB where the UE got suspended.

Steps 1205 to 1215 are the same as steps 1110 to 1130 in FIG. 11.

In step 1220 (X2-AP: Retrieve UE Context Request), the new eNB locates the old eNB using the Resume ID and retrieves the UE context by means of the X2-AP Retrieve UE Context procedure.

In step 1225 (X2-AP: Retrieve UE Context Response), the old eNB responds to the new eNB with the UE context associated with the Resume ID.

In step 1230, it is the same step as step 1140 of FIG. 11 (in the intra eNB connection resumption).

In step 1235, it is the same step as step 1150 of FIG. 11 (in the intra eNB connection resumption).

In step 1240, it is the same as step 1160 of FIG. 11 (in the intra eNB connection resumption).

In step 1245, the new eNB initiates the S1-AP Path Switch procedure to establish a S1 UE associated signalling connection to the serving MME and to request the MME to resume the UE context.

In step 1250, the MME requests the S-GW to activate the S1-U bearers for the UE and updates the downlink path.

In step 1255, the MME acknowledges step 1245.

In step 1260 (X2-AP: UE Context Release), after the S1-AP Path Switch procedure, the new eNB triggers release of the UE context at the old eNB by means of the X2-AP UE Context Release procedure.

The resume procedure is an opportunistic procedure in that there may be cases where the RAN node does not have the stored UE context. In this case, it has been specified a solution enabling the RAN to recover the UE context by using the RRC connection setup procedure which involves UE signalling to the CN and then the CN rebuilding the UE context in the RAN. The RRC procedure for this is shown in FIG. 8. In FIG. 13, a more detailed procedure is shown for this case. This case could also be referred to as using NAS recovery or transitioning via IDLE (since the UE AS context is removed). FIG. 13 is known in the art, as such, it will not be described further.

Full RRC Configurations in LTE

In LTE, during a Handover (HO) or re-establishment, the UE context is passed from the source to the target eNB. If the target eNB does not understand any part of the UE configuration, then it triggers full configuration. The full configuration procedure is specified in Third Generation Partnership Project Technical Specification (3GPP TS) 36.331 section 5.3.5.8 as below.

The UE shall:
1> release/clear all current dedicated radio configurations except the MCG C-RNTI, the MCG security configuration and the PDCP, RLC, logical channel configurations for the RBs and the logged measurement configuration;
NOTE 1: Radio configuration is not just the resource configuration but includes other configurations like MeasConfig and OtherConfig.
1> if the RRCConnectionReconfiguration message includes the mobilityControlInfo:
2> release/clear all current common radio configurations;
2> use the default values specified in 9.2.5 for timer T310, T311 and constant N310, N311;

1> else:
  2>use values for timers T301, T310, T311 and constants N310, N311, as included in ue-TimersAndConstants received in SystemInformationBlockType2 (or SystemInformationBlockType2-NB in NB-IoT);
1>apply the default physical channel configuration as specified in 9.2.4;
1>apply the default semi-persistent scheduling configuration as specified in 9.2.3;
1>apply the default MAC main configuration as specified in 9.2.2;
1>if the UE is a NB-IoT UE; or
1>for each srb-Identity value included in the srb-ToAddModList (SRB reconfiguration):
  2>apply the specified configuration defined in 9.1.2 for the corresponding SRB;
  2>apply the corresponding default RLC configuration for the SRB specified in 9.2.1.1 for SRB1 or in 9.2.1.2 for SRB2;
  2>apply the corresponding default logical channel configuration for the SRB as specified in 9.2.1.1 for SRB1 or in 9.2.1.2 for SRB2;
NOTE 2: This is to get the SRBs (SRB1 and SRB2 for handover and SRB2 for reconfiguration after reestablishment) to a known state from which the reconfiguration message can do further configuration.
1> for each eps-BearerIdentity value included in the drb-ToAddModList that is part of the current UE configuration:
  2>release the PDCP entity;
  2>release the RLC entity or entities;
  2>release the DTCH logical channel;
  2>release the drb-identity;
NOTE 3: This will retain the eps-bearerIdentity but remove the DRBs including drb-identity of these bearers from the current UE configuration and trigger the setup of the DRBs within the AS in Section 5.3.10.3 using the new configuration. The eps-bearerIdentity acts as the anchor for associating the released and re-setup DRB. In the AS the DRB re-setup is equivalent with a new DRB setup (including new PDCP and logical channel configurations).
  1> for each eps-BearerIdentity value that is part of the current UE configuration but not part of the drb-ToAddModList:
    2> perform DRB release as specified in 5.3.10.2;

As can be seen from above, the full configuration option includes an initialization of the radio configuration, which makes the procedure independent of the configuration used in the source cell(s) with the exception that the security algorithms are continued for the RRC re-establishment. If a DRB is not included in the drb-ToAddModList, the DRB will be released, and hence a message to upper layers is sent indicating the release of the bearer (i.e. a full-fledged bearer setup from scratch is required to continue data service(s) associated with the released bearer(s)). For those bearers included in the drb-toAddModList, the PDCP/RLC/Logical Channel (LCH) entities are released and established again.

The advantages with using full configuration is that the target node (of the handover) does not need to understand the UE configuration in the source node. This makes it then possible to support mobility between different nodes which support different protocol versions of the RRC and other protocols. It also makes it possible to handle cases when the source and target nodes support different solutions for UE handling and configuration (e.g. using different algorithms).

The disadvantage of using full configuration (i.e. the advantage of using delta signaling) is that full configuration may lead to larger messages sent over the radio compared to delta signaling where only relevant parts of the UE context is reconfigured.

Note that even though full configuration is normally employed during HO or re-establishment, the network may decide to perform a full reconfiguration of the UE at any time.

SUMMARY

The full configuration procedure described above is performed by sending an RRCConnectionReconfiguation message with the fullConfig flag set and it is not available for other radio reconfiguration messages such as re-establishment and resume. In the case of re-establishment, the procedure is always followed by an RRCConnectionReconfiguation procedure, and as such full configuration can be performed during this stage. On the other hand, one of the main aims of the resume procedure is to transit the UE to connected mode as fast as possible (with as little signaling as possible), reusing the saved configuration of the UE when it got suspended, and thus an additional RRCConnectionReconfiguation is not needed.

However, there are scenarios where, during resuming after suspending, the target node doesn't understand the radio configuration of the UE, and since full configuration is not supported, the only viable option for the UE to resume will be via IDLE mode (as illustrated in FIGS. 8 and 12), which incurs further delays in the service continuity at the UE.

In the context of rel-15 and EN-DC, such situations can easily happen. For example, a UE may be configured to use NR PDCP for some of the radio bearers (SRBs or DRBs), even when it is not in EN-DC mode, it can be resumed in an eNB that doesn't support NR PDCP.

In order to resolve this problem to some extent, a solution was proposed in the provisional patent application No. 62/565,067, filed with the USPTO on Sep. 28/2017 (the content of which is herein incorporated), and later captured in an agreement that was made in RAN2 #100 meeting [ftp://ftp.3gpp.org/tsg_ran/WG2_RL2/TSGR2_100/Report/RAN2-100-Reno-Chair-Notes-2017-12-01-eom.docx].

| | Agreements |
|---|---|
| 1 | On re-establishment,<br>• UE reverts to using LTE PDCP for SRB1<br>• If target eNB supports NR-PDCP, it can use RRCConnectionReconfiguration to revert the PDCP version of SRB1 or any other bearers to NR<br>• If target eNB doesn't support NR-PDCP, it can perform full configuration to revert the PDCP version of all bearers to LTE PDCP. |
| 2 | On resume,<br>• UE reverts to using LTE PDCP for SRB1 |
| 3 | The RRCResume message extend to enable configuration of bearers with NR PDCP |

This solution ensures that the eNB will be able to send the RRCConnectionResume command in SRB1 that uses LTE PDCP, and the UE will be able to understand it. However, the solution still requires that the eNB understands the UE context (or configuration) in the source cell to know how it should be able to configure the UE in the target cell. If the target cell (or network node) does not understand the UE context it will have no choice but to let the UE perform NAS recovery by sending an RRC connection setup message to the UE (as illustrated in FIGS. 8 and 12).

Certain aspects and their embodiments of the present disclosure may provide solutions to the above mentioned problems.

According to a first aspect, a method in a network node (e.g., base station, gNB, eNB) is provided. The method includes: receiving, from a wireless device, a request to resume a connection in a communication network; in response to the request, sending a resume message to the wireless device, the message comprising an indication to perform a full configuration.

According to a second aspect, a network node comprising circuitry is provided. The circuitry may include one or more processors and memory. The network node is operable to perform steps according to embodiments of the method disclosed herein, according to the various aspects.

According to a third aspect, some embodiments include a network node configured, or operable, to perform one or more network node functionalities (e.g. actions, operations, steps, etc.) as described herein.

In some embodiments, the network node may comprise one or more communication interfaces configured to communicate with one or more other radio nodes and/or with one or more network nodes, and processing circuitry operatively connected to the communication interface, the processing circuitry being configured to perform one or more network node functionalities as described herein. In some embodiments, the processing circuitry may comprise at least one processor and at least one memory storing instructions which, upon being executed by the processor, configure the at least one processor to perform one or more network node functionalities as described herein.

In some embodiments, the network node may comprise one or more functional modules configured to perform one or more network node functionalities as described herein.

According to a fourth aspect, some embodiments include a non-transitory computer-readable medium storing a computer program product comprising instructions which, upon being executed by processing circuitry (e.g., at least one processor) of the network node, configure the processing circuitry to perform one or more network node functionalities as described herein.

According to fifth aspect, computer programs, computer readable media configured to process and/or store instructions for steps according to embodiments of the method disclosed herein, according to the various aspects, are also provided.

According to sixth aspect, a method in a wireless device is provided. The method includes: sending to a network node a request to resume a connection in a communication network; receiving a resume message from the network node, the message comprising an indication to perform a full configuration; and applying the full configuration.

According to a seventh aspect, a wireless device comprising circuitry is provided. The circuitry may include one or more processors and memory. The wireless device is operable to perform steps according to embodiments of the method disclosed herein, according to the various aspects.

According to an eighth aspect, some embodiments include a network node configured, or operable, to perform one or more network node functionalities (e.g. actions, operations, steps, etc.) as described herein.

In some embodiments, the wireless device may comprise one or more communication interfaces configured to communicate with one or more other radio nodes and/or with one or more network nodes, and processing circuitry operatively connected to the communication interface, the processing circuitry being configured to perform one or more wireless device functionalities as described herein. In some embodiments, the processing circuitry may comprise at least one processor and at least one memory storing instructions which, upon being executed by the processor, configure the at least one processor to perform one or more wireless device functionalities as described herein.

Certain embodiments of aspects of the present disclosure may provide one or more technical advantages, including:

It will be possible to resume a suspended UE in an e/gNB that is employing an earlier version of the RAT (or the same version of the RAT but with limited functionality) than that is being used by the source eNB where the UE got suspended (or was sent to inactive mode).

Uniform UE behavior as the UE roams within the network (i.e. UE can be resumed with the same latency regardless of the version of RAT being used by the source and target).

Operators get some leeway in terms of when to upgrade their network nodes (i.e. they are not required to upgrade all their network nodes to support resume functionality whenever they deploy new network nodes employing the latest version of the RAT or upgrade some parts of their already deployed nodes).

Certain embodiments may have some, or none of the above advantages. Other advantages will be apparent to persons of ordinary skill in the art.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 14:
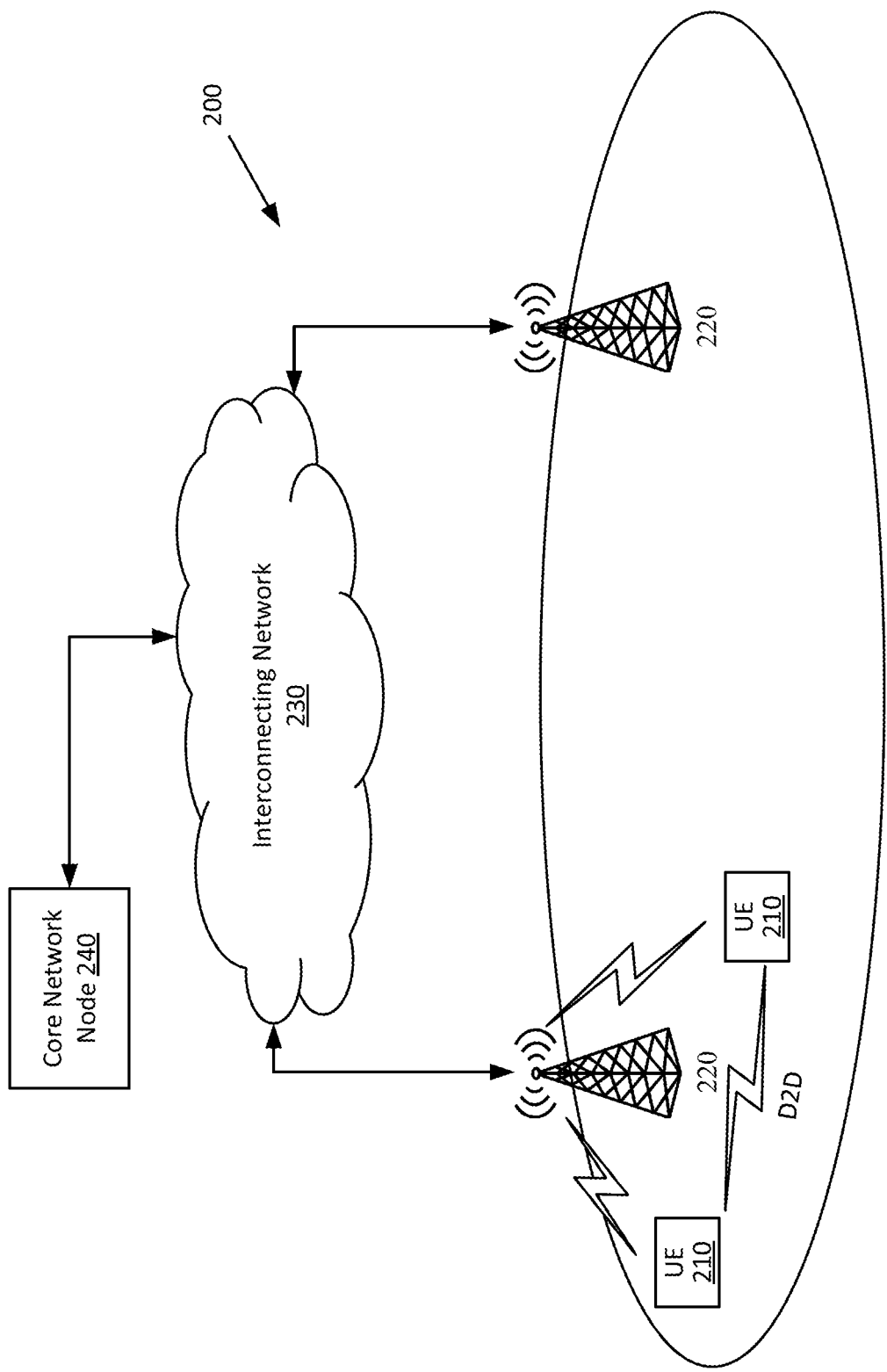
FIG. 14 illustrates a schematic block diagram of a communication network.

FIG. 14 illustrates a wireless communication network 200 for wireless communications. Wireless communication network 200 includes wireless devices 210 (e.g., user equipments, UEs) and a plurality of network nodes 220 (e.g., eNBs, gNBs, base stations, etc.) connected to one or more core network nodes 240 via an interconnecting network 230. Wireless devices 210 within a coverage area may each be capable of communicating directly with network nodes 220 over a wireless interface. The UEs 210 are massive MIMO (M-MIMO) capable UEs, for example. The network node can be the serving network node of the M-MIMO UE or any network node with which the M-MIMO UE can establish or maintain a communication link and/or receive information (e.g. via broadcast channel). As such, the network node may comprise multiple antennas, distributed over a plurality of RRHs.

In certain embodiments, wireless devices 210 may also be capable of communicating with each other via device-to-device (D2D) communication. In certain embodiments, network nodes 220 may also be capable of communicating with each other, e.g. via an interface (e.g. X2 in LTE or other suitable interface).

As an example, wireless device 210 may communicate with network node 220 over a wireless interface. That is, wireless device 210 may transmit wireless signals and/or receive wireless signals from network node 220. The wireless signals may contain voice traffic, data traffic, control signals, and/or any other suitable information. In some embodiments, an area of wireless signal coverage associated with a network node 220 may be referred to as a cell.

In some embodiments wireless device 210 may be interchangeably referred to by the non-limiting term user equipment (UE). Wireless device 210 can be any type of wireless device capable of at least M-MIMO communications with a network node or another UE over radio signals. Examples of such M-MIMO UEs are a sensor, modem, smart phone, machine type (MTC) device aka machine to machine (M2M) device, PDA, iPAD, Tablet, smart phone, laptop embedded equipped (LEE), laptop mounted equipment (LME), USB dongles etc.

In some embodiments, the "network node" can be any kind of network nodes. Examples of network nodes are eNodeB, Node B, Base Station, wireless access point (AP), base station controller, radio network controller, relay, donor node controlling relay, base transceiver station (BTS), transmission points, transmission nodes, Remote Radio Unit (RRU), Remote Radio Head (RRH), nodes in distributed antenna system (DAS), core network node, Mobility Management Entity (MME) etc.

In certain embodiments, network nodes 220 may interface with a radio network controller (not shown). The radio network controller may control network nodes 220 and may provide certain radio resource management functions, mobility management functions, and/or other suitable functions. In certain embodiments, the functions of the radio network controller may be included in the network node 220. The radio network controller may interface with the core network node 240. In certain embodiments, the radio network controller may interface with the core network node 240 via the interconnecting network 230.

The interconnecting network 230 may refer to any interconnecting system capable of transmitting audio, video, signals, data, messages, or any combination of the preceding. The interconnecting network 230 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 240 may manage the establishment of communication sessions and various other functionalities for wireless devices 210. Examples of core network node 340 may include MSC, MME, SGW, PGW, O&M, OSS, SON, positioning node (e.g. E-SMLC), MDT node, etc. Wireless devices 210 may exchange certain signals with the core network node 240 using the non-access stratum layer. In non-access stratum signaling, signals between wireless devices 310 and the core network node 240 may be transparently passed through the radio access network. In certain embodiments, network nodes 220 may interface with one or more other network nodes over an internode interface. For example, network nodes 220 may interface each other over an X2 interface.

Although FIG. 14 illustrates a particular arrangement of network 200, the present disclosure contemplates that the various embodiments described herein may be applied to a variety of networks having any suitable configuration. For example, network 200 may include any suitable number of wireless devices 210 and network nodes 220, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data).

Although terminology from 3GPP LTE (or E-UTRAN) has been used in this disclosure to exemplify the embodiments and describe both the serving and victim network nodes, this should not be seen as limiting the scope of the disclosure to only the aforementioned system. Other wireless systems, including WCDMA, UTRA FDD, UTRA TDD, and GSM/GERAN/EDGE, may also benefit from exploiting the ideas covered within this disclosure. Furthermore, embodiments of this disclosure can apply to scenarios in which the serving and victim nodes employ differing radio access technologies (RATs).

As mentioned above, the full reconfiguration (or configuration) procedure is not available for radio control procedures such as the re-establishment and resume procedures.

Embodiments of this disclosure can address the drawbacks of the current LTE and NR Resume procedures, for the case where an UE resumes in an eNB/gNB that does not support all the functionalities of the source eNB. In such a case, the target eNB/gNB may not be able to read the information contained in the UE AS context, thereby making it impossible to resume the UE connection without going back to the IDLE mode (also known as NAS recovery). Using the NAS recovery may generate additional delays and signaling. Some embodiments mitigate this problem, by introducing the possibility to perform a full reconfiguration during the resume procedure, for example.

Embodiment A

Figure 1:
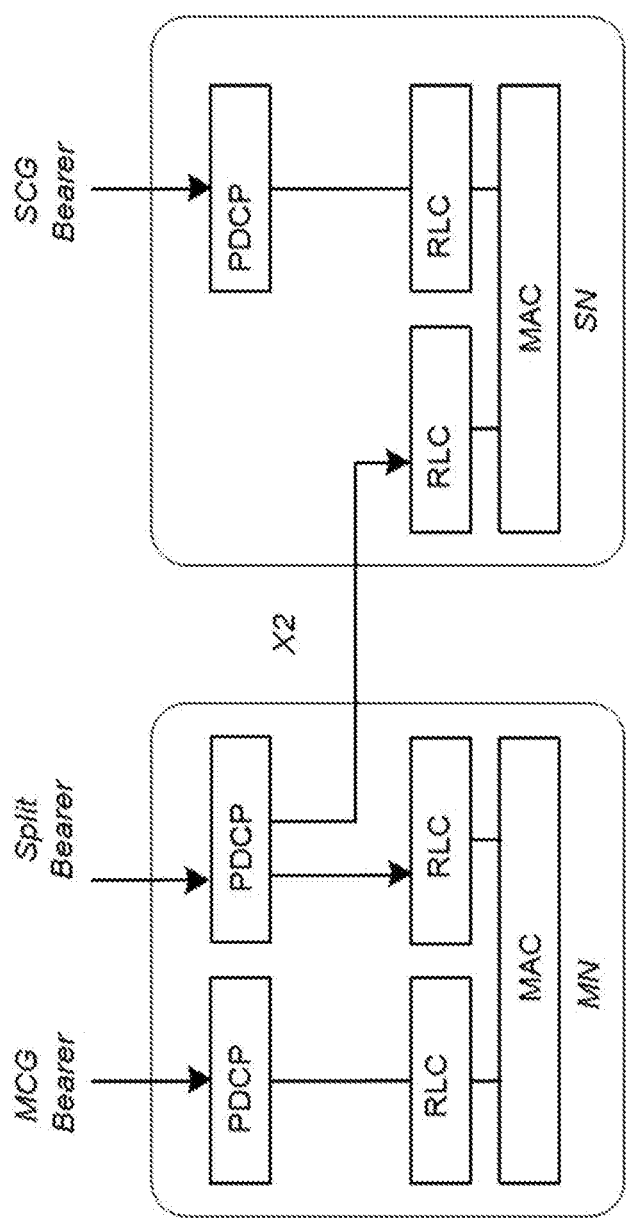
FIG. 1 illustrates a schematic block diagram of a LTE DC User Plane (UP).
Figure 2:
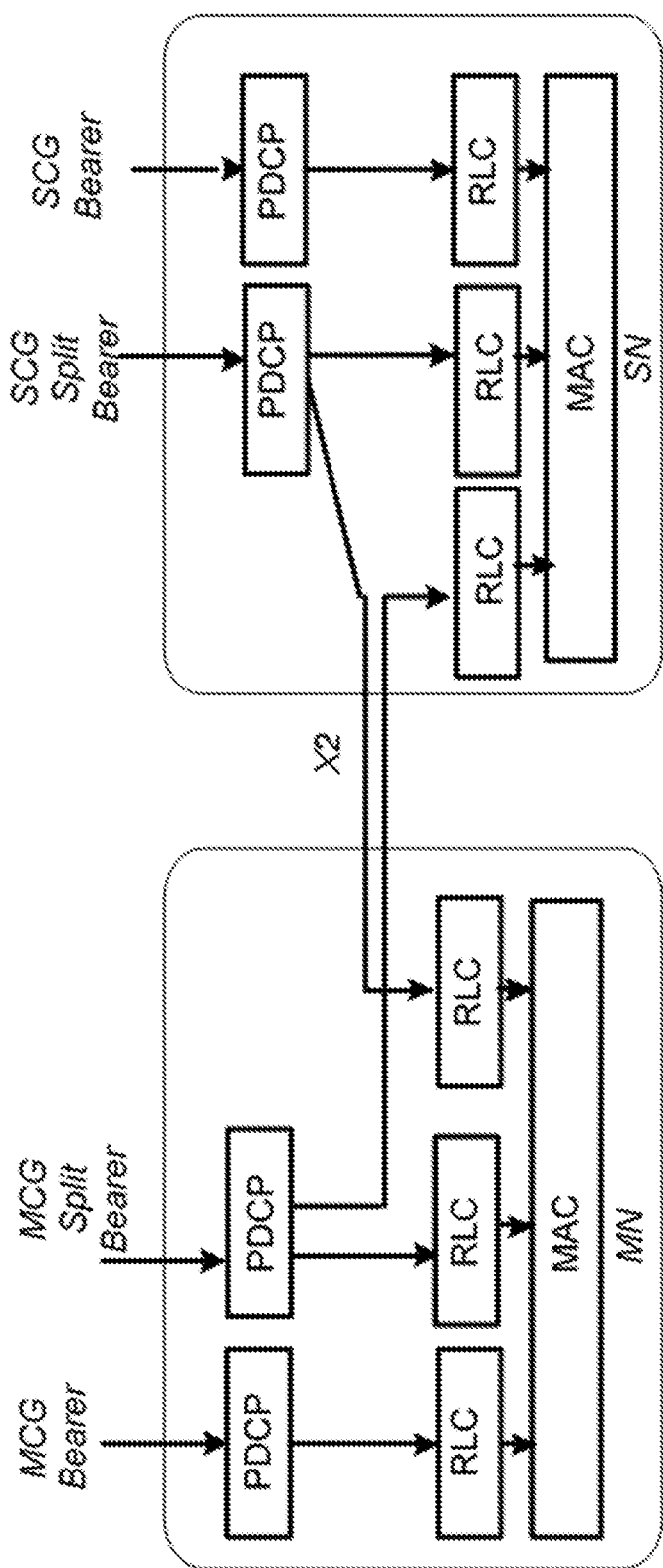
FIG. 2 is a schematic block diagram of a LTE-NR tight interworking for the UP.
Figure 3:
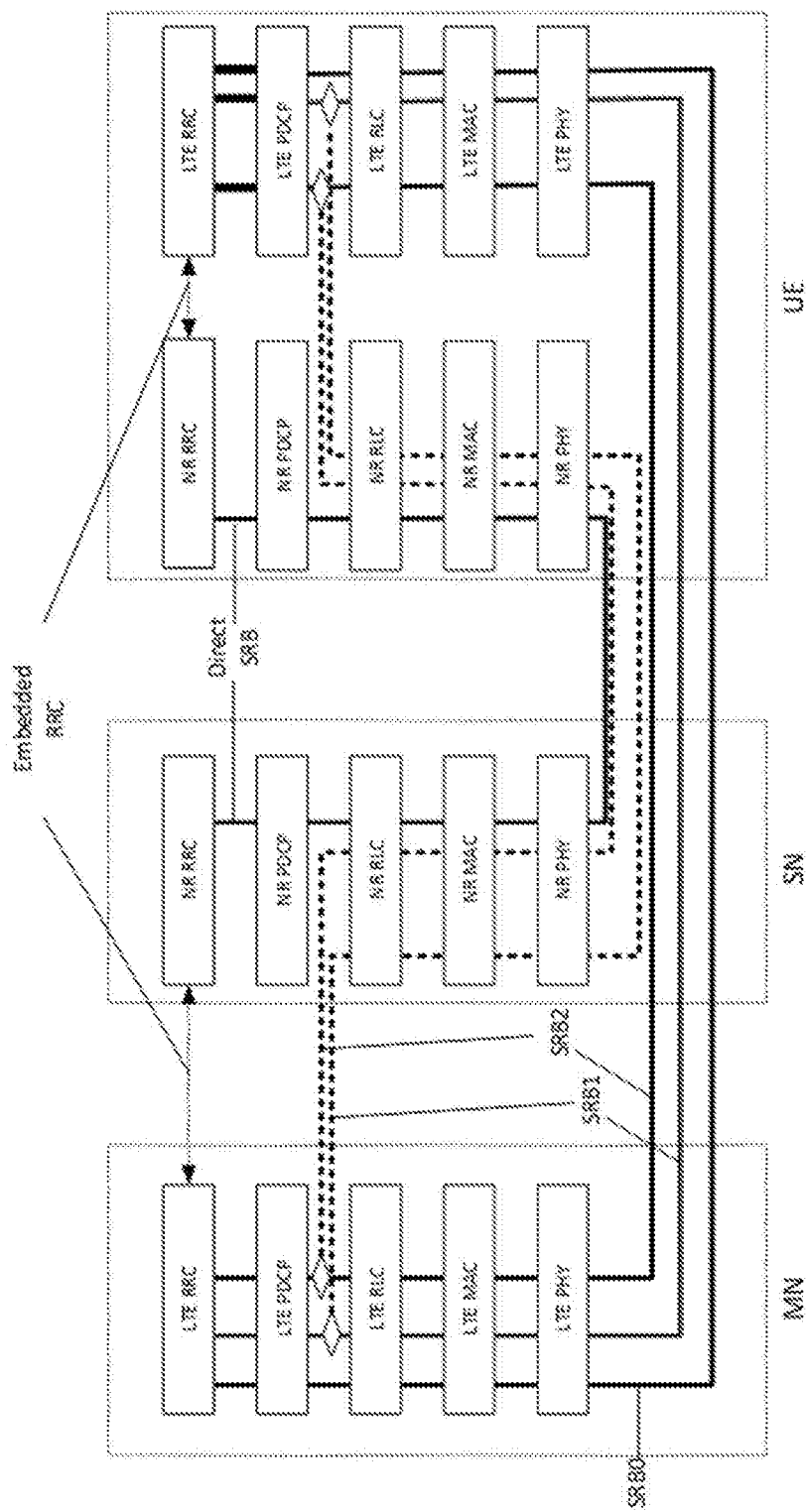
FIG. 3 is a schematic block diagram of a LTE-NR tight interworking for the Control Plane (CP).
Figure 4:
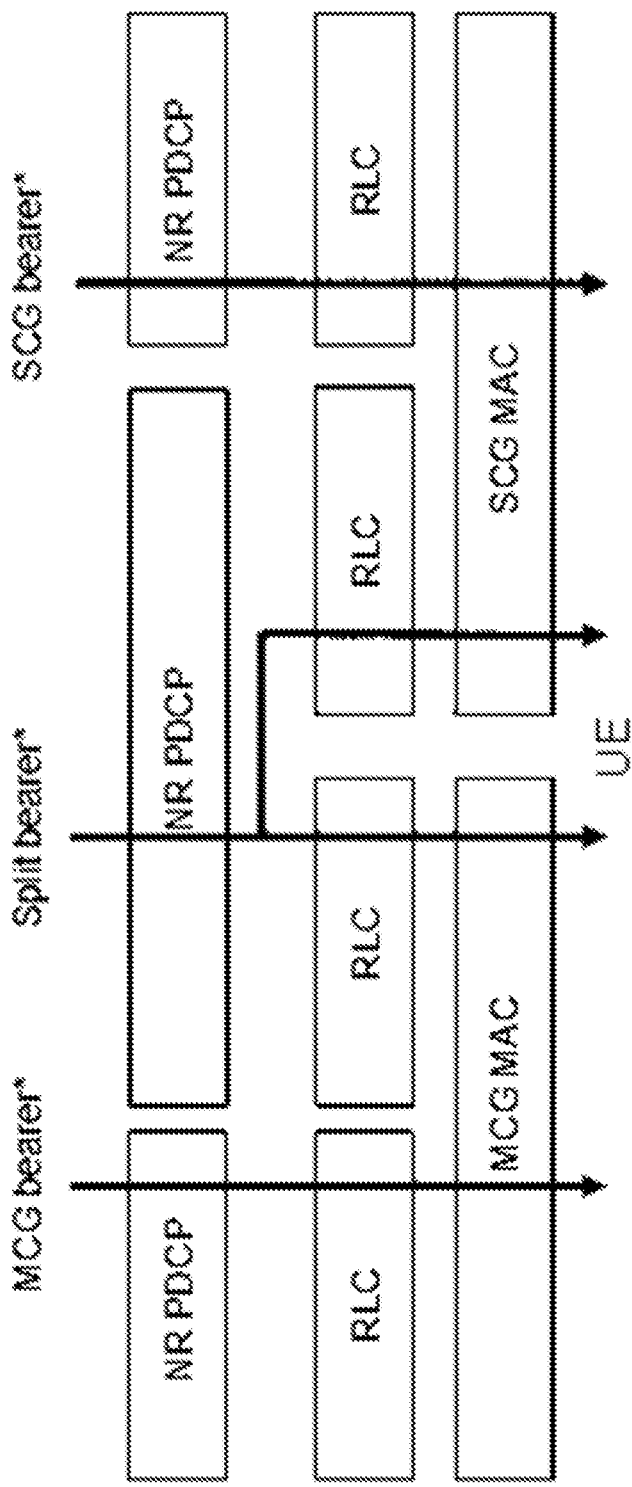
FIG. 4 illustrates a schematic block diagram of the configuration of 3 bearers in a communication network.
Figure 5:
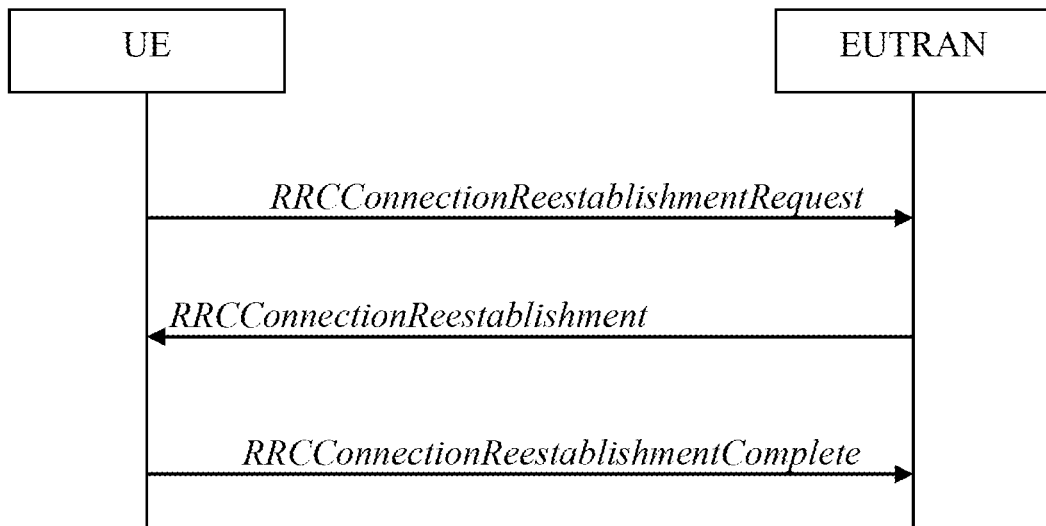
FIG. 5 illustrates a signal diagram of a successful RRC connection re-establishment procedure.
Figure 6:
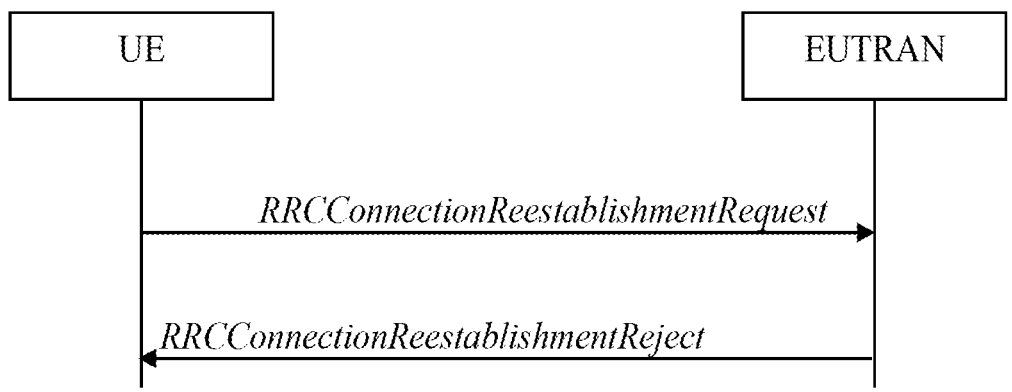
FIG. 6 illustrates a signal diagram of a failed RRC connection re-establishment procedure.
Figure 7:
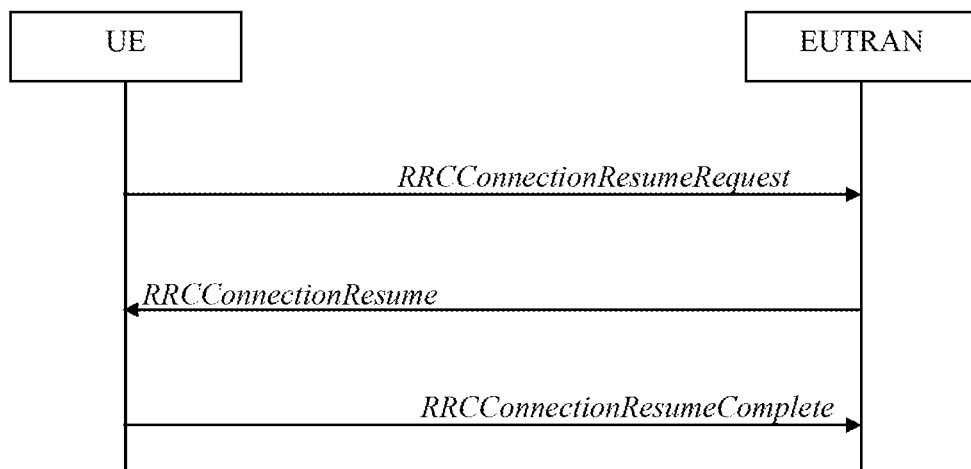
FIG. 7 illustrates a signal diagram of a successful RRC connection resume procedure.
Figure 8:
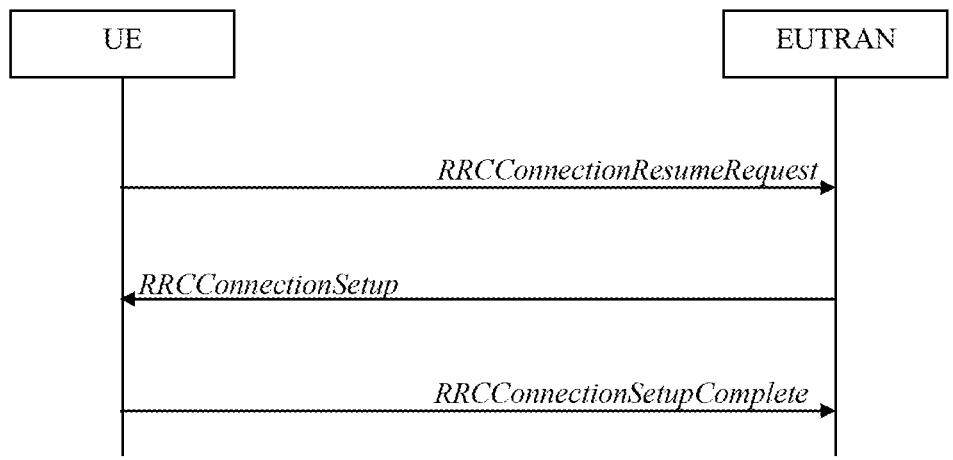
FIG. 8 illustrates a signal diagram of a successful RRC connection resume fallback to RRC connection establishment procedure.
Figure 9:
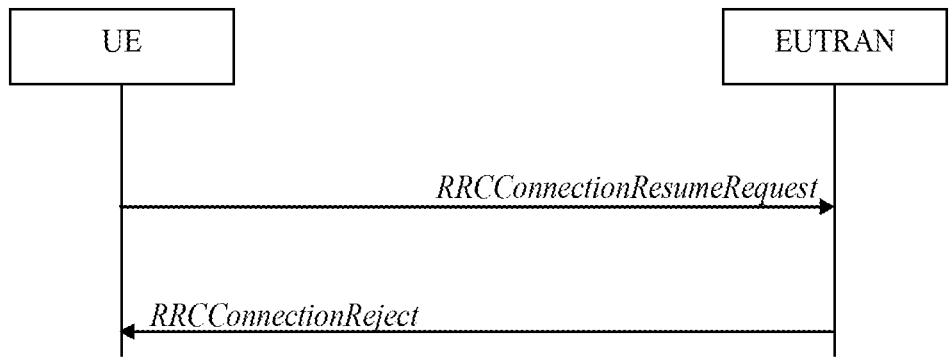
FIG. 9 illustrates a signal diagram of a RRC connection resume procedure, with a network reject or release.
Figure 10:
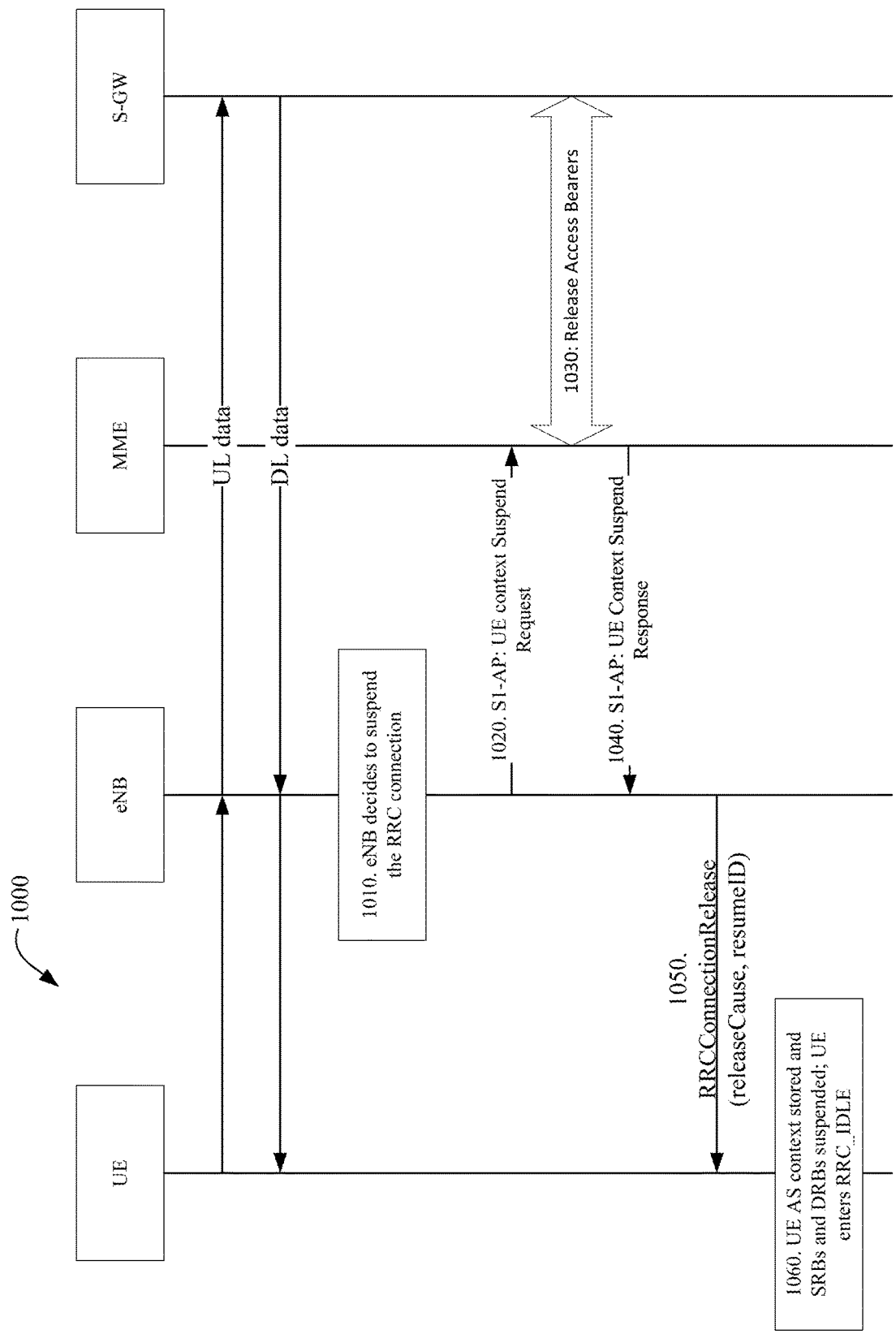
FIG. 10 is a signal diagram of a RRC connection suspend.
Figure 11:
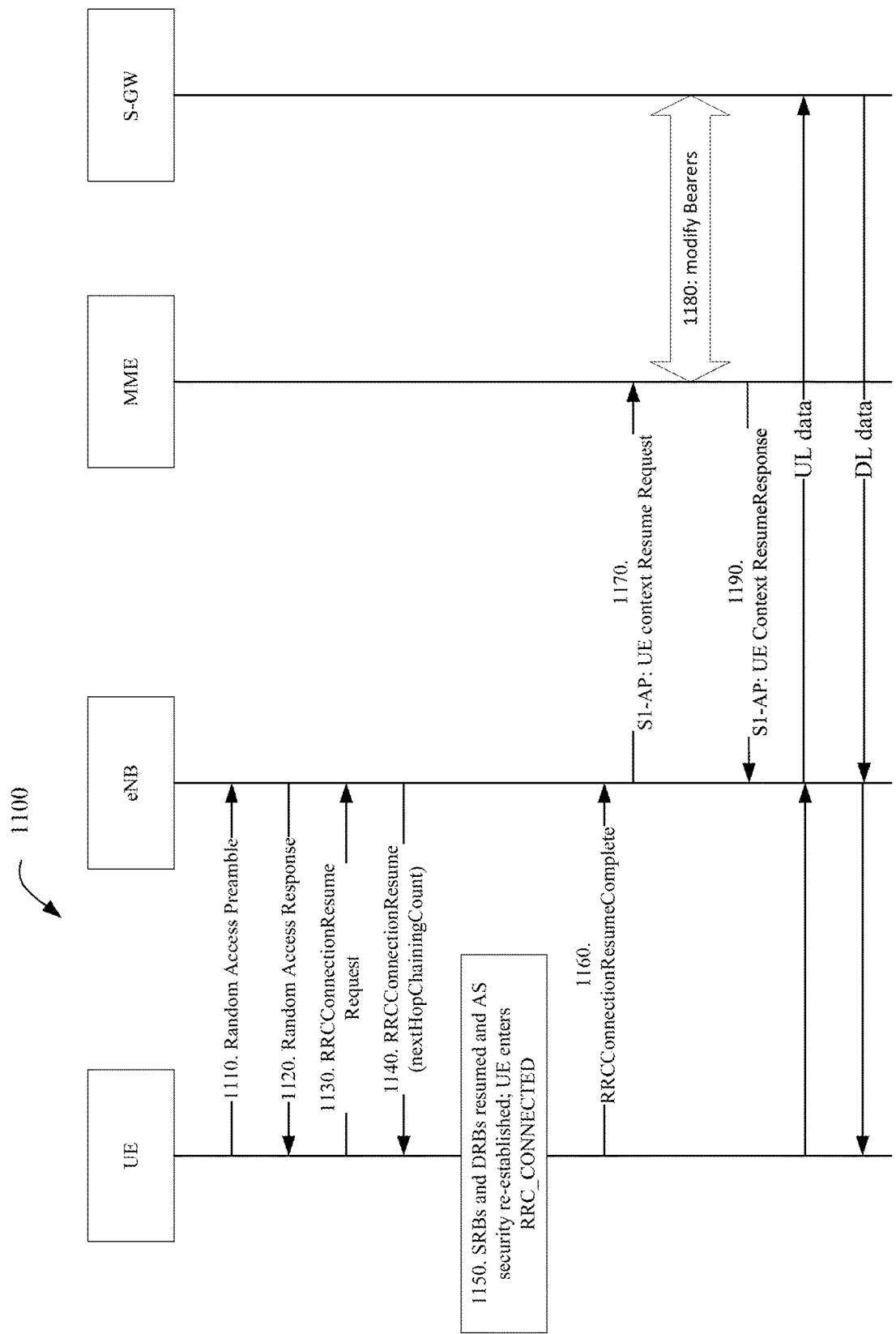
FIG. 11 is another signal diagram of a RRC connection resume procedure.
Figure 12:
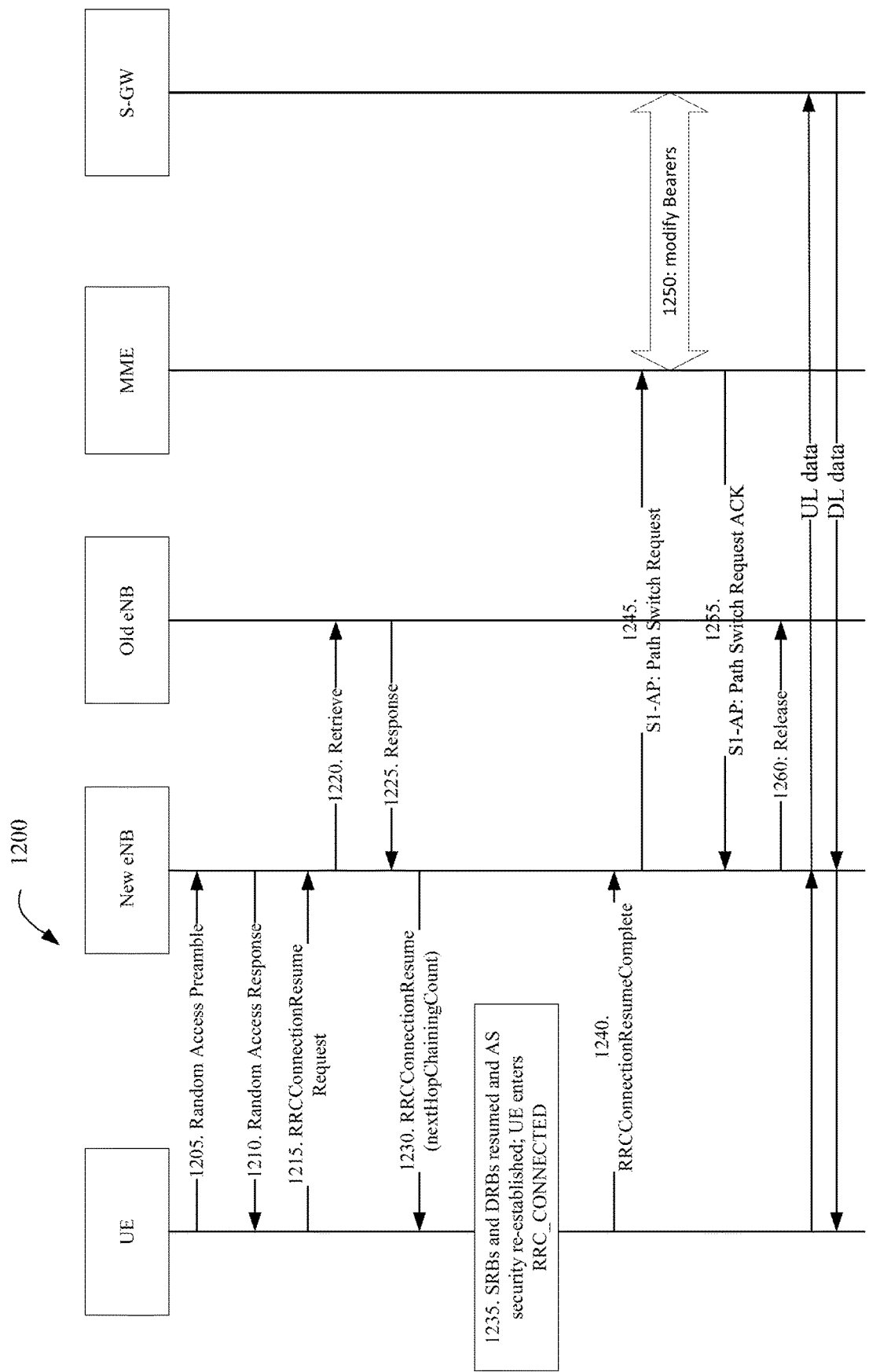
FIG. 12 is a signal diagram of a RRC connection resume procedure in a target network node that is different from the source network node where the UE got suspended.
Figure 13:
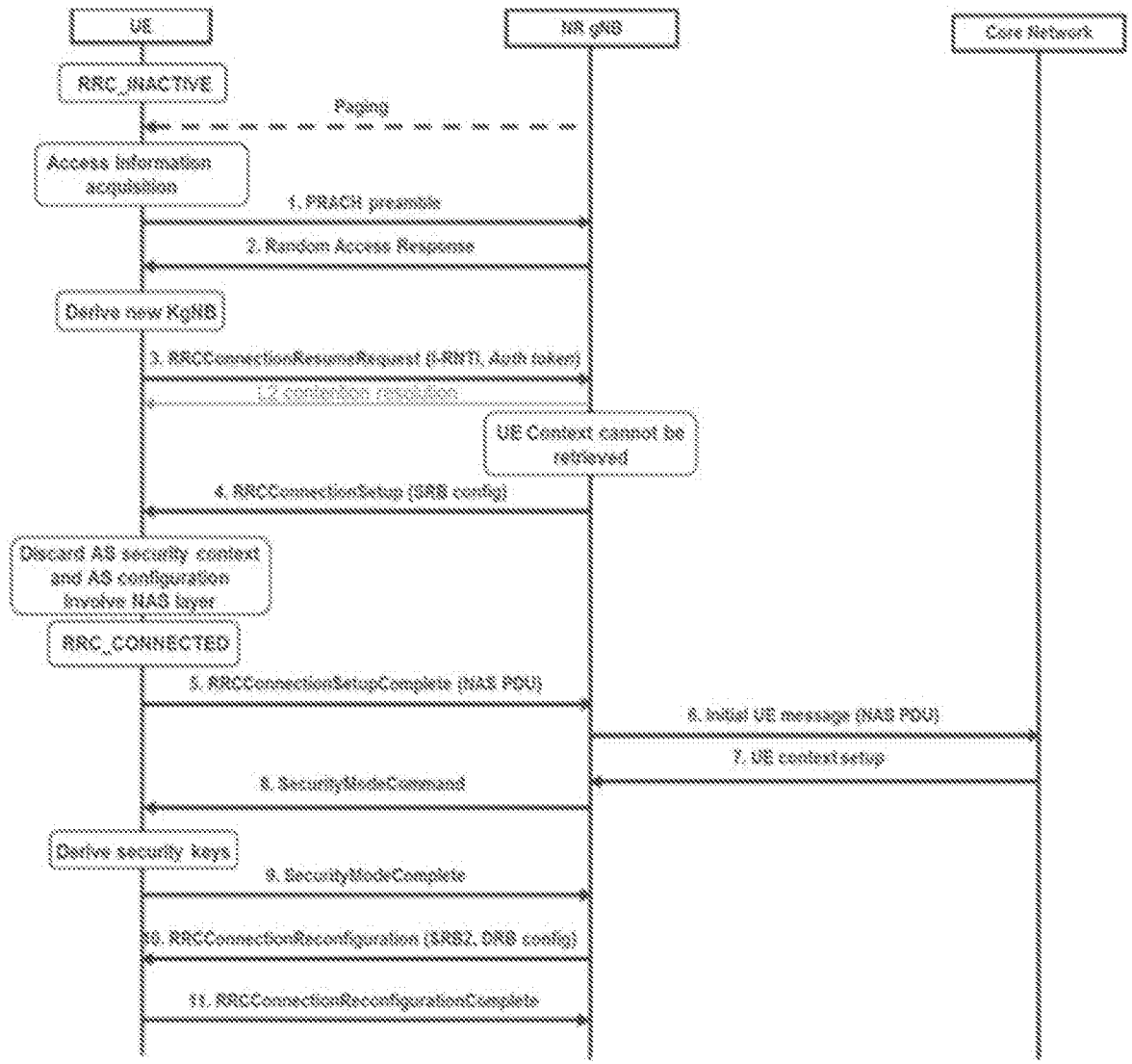
FIG. 13 illustrates a signal diagram for handling the case when a UE context cannot be retrieved.

Embodiment A proposes to utilize a full configuration towards the UE in the resume procedure, as shown in FIG. 12, but where the new eNB is not compatible with the old eNB, meaning that the new eNB cannot read, identify, understand, access some files, such as the configuration information (e.g. UE AS context).

More specifically, the resume procedure is enhanced to support a full configuration (or reconfiguration). When a target/new eNB (gNB) gets a resume request from a UE (see for example step 1215 of FIG. 12), it retrieves a UE AS context from the source/old eNB (see steps 1220 and 1225 of FIG. 12). In case the target/new eNB and the source/old eNB are different (using different radio access technologies or different releases of the technology), the target eNB may not be able to fully access or read the UE AS context.

Figure 15:
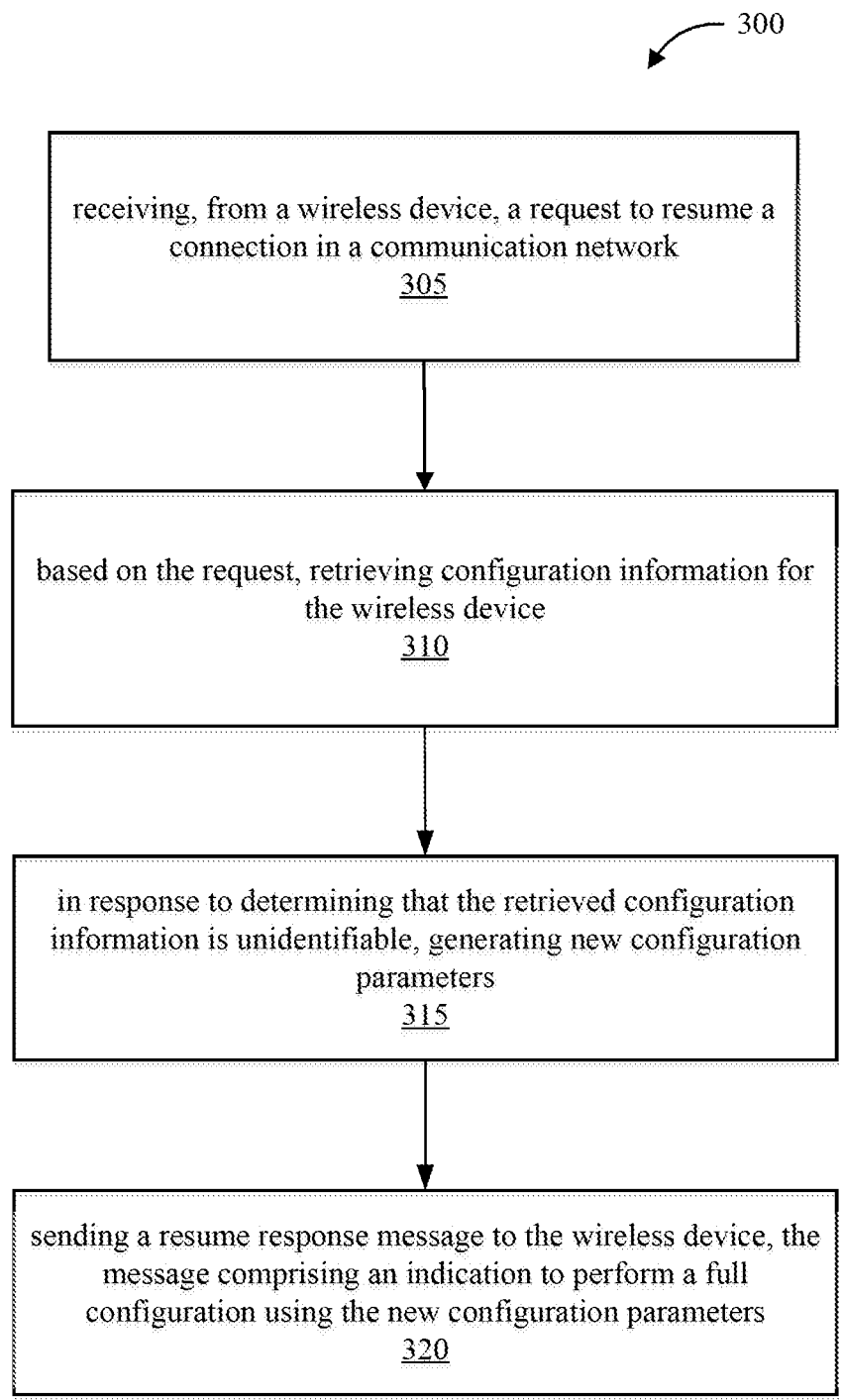
FIG. 15 illustrates a flow chart of a method in a network node, according to an embodiment.

FIG. 15 illustrates a method 300 for resuming a connection in a network node, such as the new eNB. In such a case, the target eNB (gNB) performs the following steps or operations of:

Step 305: receiving, from a wireless device, a request to resume a connection in the communication network.

Step 310: based on the request, retrieving configuration information (e.g. UE AS context) for the wireless device.

Step 315: in response to determining that the retrieved configuration information is unidentifiable, generating new configuration parameters.

Step 320: sending a resume response message to the wireless device, the message comprising an indication to perform a full configuration using the new configuration parameters.

In step 305, the request to resume can be a RRC Connection Resume Request.

In step 315: after determining that the retrieved configuration information is unidentifiable, the new eNB can just ignore the retrieved UE AS context information. Then, it can prepare (or generate) a new UE AS context information from the S1 or NG context information that is provided during the retrieval of the UE AS context. The S1 and NG context contains information that the core network has sent down to the RAN during the initial UE context setup or at a subsequent signaling. This information could comprise radio parameters for configuration and information regarding the different bearers. This information should be sufficient for the target eNB to rebuild the UE AS context.

In step 320: the new eNB prepares the RRC Resume message that includes the new UE AS context information for sending to the wireless device. To do so, the new eNB sets a flag to the full configuration in the RRC Resume message. Once the flag is set, it could be referred to as the fullConfig flag. In the current systems, there is no such flag in the Resume message. Then, the new eNB sends the RRC Resume message to the UE with the flag.

In response to receiving the RRC resume message that contains the fullConfig flag, the UE will discard the old bearer configuration and other old radio parameters, for example. Then, it will only apply the (new) configuration it received in the RRC Resume message. In this way, the UE could switch to a new configuration from a network node which cannot understand the old configuration. It should be noted that some parameters, such as the security keys, will be kept in the UE even after receiving the fullConfig flag since the encryption and integrity protection is already up and running when the network node (gNB) sends the RRC Resume message.

Figure 16:
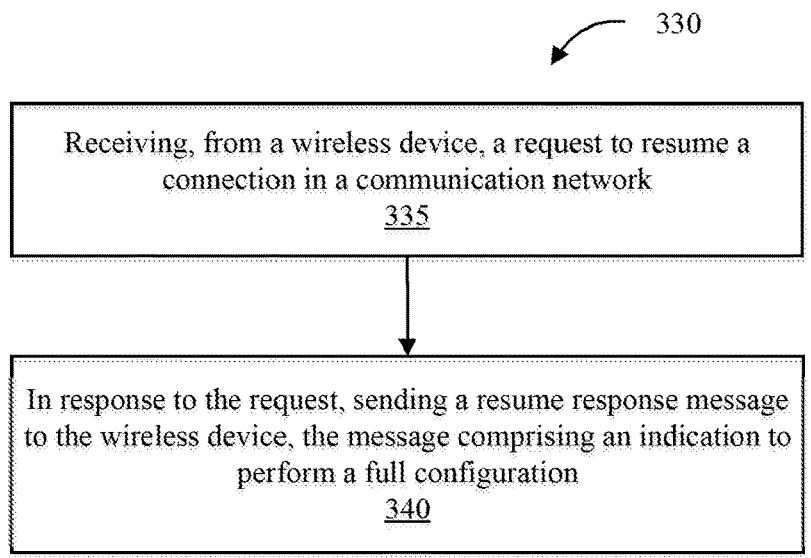
FIG. 16 illustrates a flow chart of another method in a network node, according to an embodiment.

It should be noted that modifications, additions, or omissions may be made to method 300 of FIG. 15. Additionally, one or more steps in method 300 may be performed in parallel or in any suitable order. As such, FIG. 16 illustrates another method 300 for resuming a connection with a network node. This method is referred to as method 330 and can be performed in a network node 220 of FIG. 14. This network node may be referred to as the new network nod or a target eNB or gNB. Method 330 includes the following steps:

Step 335: receiving, from a wireless device, a request to resume a connection in the communication network.

Step 340: in response to the request, sending a resume response message to the wireless device, the message comprising an indication to perform a full configuration.

In some examples, the network node 220 (e.g. new eNB) can retrieve configuration information (e.g. UE AS context) from the source/old eNB upon receipt of the resume request.

Furthermore, in case the target/new eNB and the source/old eNB are different (using different radio access technologies, or different releases of the technology), the target eNB may not be able to fully access or read the UE AS context. In this case, the new eNB can generate configuration parameters (which are new compared to the current configuration parameters) for the full configuration.

In some embodiments, the new network node may determine that the retrieved configuration information is unidentifiable/unreadable, the new eNB can just ignore the retrieved UE AS context information. Then, it can prepare (or generate) configuration parameters, e.g. new UE AS context information from the S1 or NG context information that is provided during the retrieval of the UE AS context. The S1 and NG contexts contain information that the core network has sent down to the RAN during the initial UE context setup or at a subsequent signaling. This information could comprise radio parameters for configuration and information regarding the different bearers. This information should be sufficient for the target eNB to rebuild the UE AS context. As a note, S1 is the interface between the eNB and the core network, when the core network is Enhanced Packet Core (EPC). NG is the interface between an eNB/gNB and the core network, when the core network is 5GC.

In some embodiments, the new eNB prepares the RRC Resume message that includes the new UE AS context information (or configuration parameters) to be sent to the wireless device. The new eNB sets a flag to the full configuration in the RRC Resume message. Once the flag is set, it could be referred to as the fullConfig flag. Then, the new eNB sends the RRC Resume message to the UE with the flag.

In response to receiving the RRC resume message that contains the fullConfig flag, the UE will discard the old bearer configuration and other old radio parameters, for example. Then, it will only apply the (new) configuration it received in the RRC Resume message. In this way, the UE could switch to a new configuration from a network node which cannot understand the old configuration. It should be noted that some parameters, such as the security keys, will be kept in the UE even after receiving the fullConfig flag since the encryption and integrity protection is already up and running when the network node (gNB) sends the RRC Resume message.

In some embodiments, the configuration parameters comprise one or more of bearer configuration, Packet Data Convergence Protocol (PDCP) configuration, Radio Link Control (RLC) configuration.

Now turning to FIG. 17, a method 350 in a wireless device/UE for resuming a connection will be described. The wireless device could be the UE 210 of FIG. 14.

Method 350 comprises the following steps:

Step 355: Sending to a network node a request to resume a connection in the communication network.

Step 360: Receiving a resume response message from the network node, the message comprising an indication to perform a full configuration.

Step 365: Applying (or performing) the full configuration.

In some embodiments, the method 350 may further comprise discarding an old bearer configuration and old radio parameters.

In some embodiments, the method 350 may further comprise keeping security keys.

In some embodiments, the method 350 may further comprise receiving a new configuration.

In some embodiments, the method 350 may further comprise applying the new configuration.

Embodiment B

Embodiment B addresses the incompatibility between the target and source network nodes (e.g. eNBs) by considering the UE context mismatch from the point of view of the network.

For example, the following network enhancements could be considered to solve the incompatibility problem of the network nodes:

1) The UE AS context information that is passed from the source network node can be coded in such a way that the target network node is able to understand the legacy information elements (IEs) (e.g. LTE PDCP configurations), even though some new IEs might have been introduced in later releases of the standard than the version of the legacy eNB.

2) When the source network node knows that the target network node is a legacy eNB, it can convert the UE AS context information to a format that the legacy eNB is able to understand (e.g. convert NR PDCP configurations to LTE PDCP configurations).

In the first case, the target network node can get the relevant bearer information that it can understand (e.g. the DRB-id and RLC and lower layer configurations) through proper coding. It can get the rest of the information for that particular bearer from the S1 bearer context (i.e. so that it can re-configure the UE with the proper LTE PDCP version). The problem with this solution is that it assumes that a legacy eNB performs something new (combine S1 or NG context with other UE context received from the source network node) to handle this case (i.e. it is not actually a legacy eNB) but at least it should be possible to add new parameters in the future which do not need to be understood by the existing eNBs, since these eNBs would get all the relevant information from the parts they understand of the UE context and the S1 context. Those parts are the parts that have been properly coded so as to be understood by all the network nodes (legacy and new generations of network nodes).

In the second case, the target eNB will understand the UE context from the source eNB. It needs however to signal all DRBs to the UE to trigger the UE to change those DRBs from the old configuration (not understood by the target eNB). Normally, the eNB does not need to signal DRB configuration for DRBs that it does not want to change (since delta signaling is used). So, an added impact of this solution would be to add a function to the target eNB to trigger the DRB signaling for all DRBs. This would require the target eNB to be upgraded, but at least it should be possible to add new parameters in the future which do not need to be understood by the existing/legacy eNBs since the eNB will understand all the parameters forwarded from the source eNB and always send the DRB configuration to the UE.

As can be seen above, the first and second solutions rely on new functionalities in both the target and source nodes, but the advantage is that once those nodes have been upgraded it should be possible in the future to add new features to the standard and only upgrade the network nodes supporting the features.

Here is a summary of some exemplary new functionalities that need to be supported for the embodiments B:

[Case 1] The source node should forward a UE context coded in such a way that the target node can understand all needed legacy parameters and ignore new parameters. The coding could for instance utilize non-critical extensions, which could be ignored by legacy target eNBs.

[Case 1] The target node should rebuild the UE context using a combination of S1 or NG context information and parameters it understands of the UE context forwarded from the source node.

[Case 2] The source node should obtain information from the target node about which release of the specification of the standard it understands or which features it supports. This could be signaled in a message from the target to the source node during X2 or Xn setup.

[Case 2] The source node should code the UE context information in a way understood by the target node. In case the target node support later releases than the source node, it is assumed that the source node's code according to its own release should be understood by the target node. The context is then sent over X2, Xn or via the Core Network to the target node.

[Case 2] The target node should trigger a re-configuration of all bearers or other relevant configuration parameters even in case it would use the same configuration as before. The purpose of this is to inform the UE, which supports later releases, that the configuration is reverted back to the legacy configuration.

Now turning to FIG. 18, a flow chart of a method 370 for resuming a connection for a wireless device in a communication network will be described. The communication network node can be the network 200. The wireless device can be the UE 210.

Method 370 can be implemented in a network node, such as the network 220 of FIG. 14.

Method 370 includes:

Step 375: receiving, from a wireless device, a request to resume a connection in a communication network;

Step 380: based on the request, retrieving configuration information for the wireless device; wherein the configuration information is adapted from a source network node to the network node so as to be usable by the network node; and Step 385: sending a resume response message to the wireless device to resume the connection based on the adapted configuration information.

For example, the configuration information can be adapted by coding at least parts of the configuration information to be readable by both the network node and the source network node.

In some embodiments, the configuration information is adapted by converting the format of the configuration information from the source network node to a format of the network node.

Figure 19:
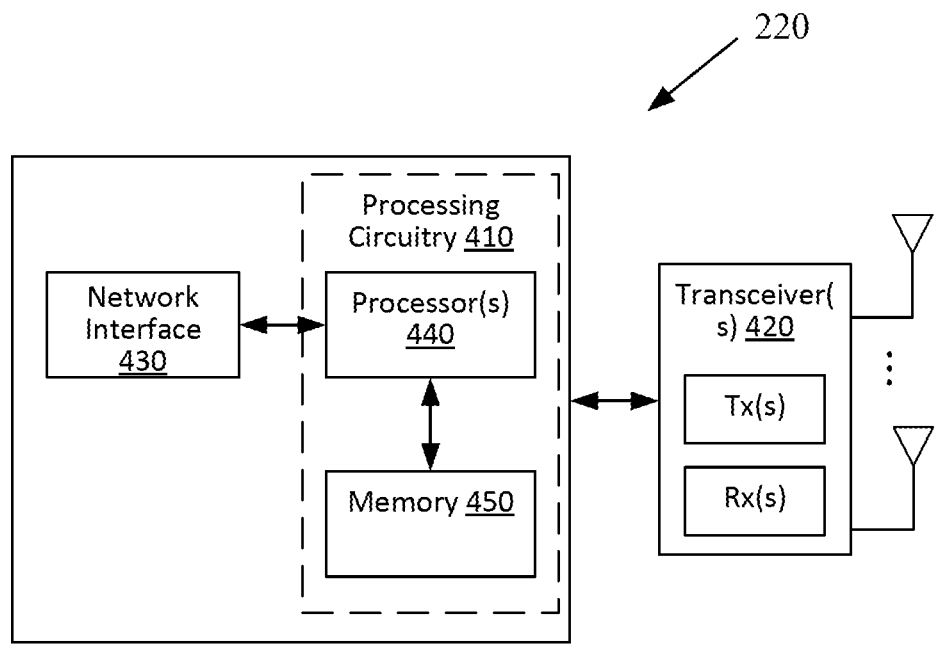
FIGS. 19 and 20 illustrate schematic block diagrams of a network node, according to some embodiments.

FIG. 19 is a block diagram of an exemplary radio network node 220, in accordance with certain embodiments. Radio network node 220 may include one or transceivers 420 with multiple antennas, processor 440, memory 450, and network interface 430. In some embodiments, the transceiver facilitates transmitting wireless signals to and receiving wireless signals from wireless device 210 (e.g., via transmitter(s) (Tx), receiver(s) (Rx), and antennas). The processor 440 executes instructions to provide some or all of the functionalities described above as being provided by a radio network node 220, the memory stores the instructions executed by the processor. In some embodiments, the processor 440 and the memory 450 form processing circuitry 410. The network interface communicates signals to backend network components, such as a gateway, switch, router, Internet, Public Switched Telephone Network (PSTN), core network nodes or radio network controllers, etc.

Figure 18:
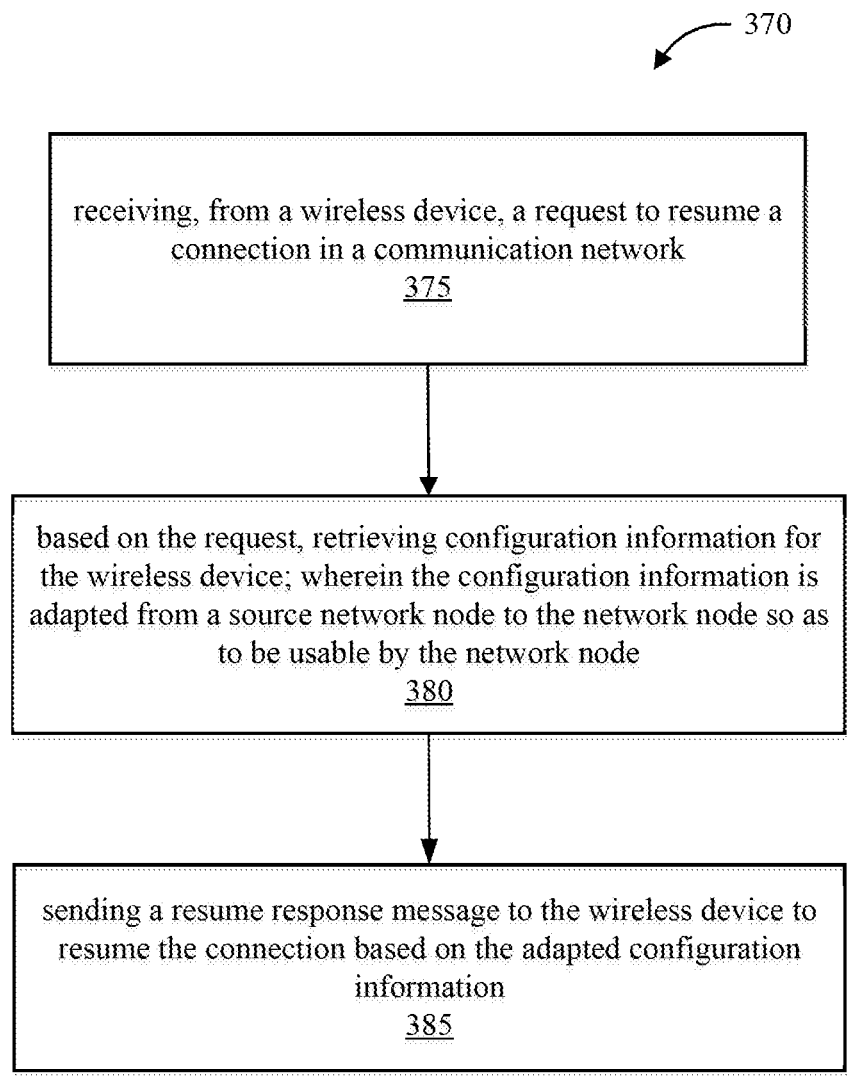
FIG. 18 illustrates a flow chart of yet another method in a network node, according to an embodiment.

The processor 440 may include any suitable combination of hardware to execute instructions and manipulate data to perform some or all of the described functions of radio network node 220, such as those described above, e.g. methods 300 of FIG. 15, 330 of FIG. 16 and 370 of FIG. 18 and their related embodiments. In some embodiments, the processor may include, for example, one or more computers, one or more central processing units (CPUs), one or more microprocessors, one or more application specific integrated circuits (ASICs), one or more field programmable gate arrays (FPGAs) and/or other logic.

The memory is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface is communicatively coupled to the processor and may refer to any suitable device operable to receive input for radio network node 220, send output from radio network node 220, perform suitable processing of the input or output or both, communicate to other devices, or any combination of the preceding. The network interface may include appropriate hardware (e.g., port, modem, network interface card, etc.) and software, including protocol conversion and data processing capabilities, to communicate through a network.

Other embodiments of radio network node 220 may include additional components beyond those shown in FIG. 19 that may be responsible for providing certain aspects of the radio network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 19 may be included in other network nodes (such as core network node 230). Other network nodes may optionally include or not include a wireless interface (such as the transceiver described in FIG. 19).

Figure 20:
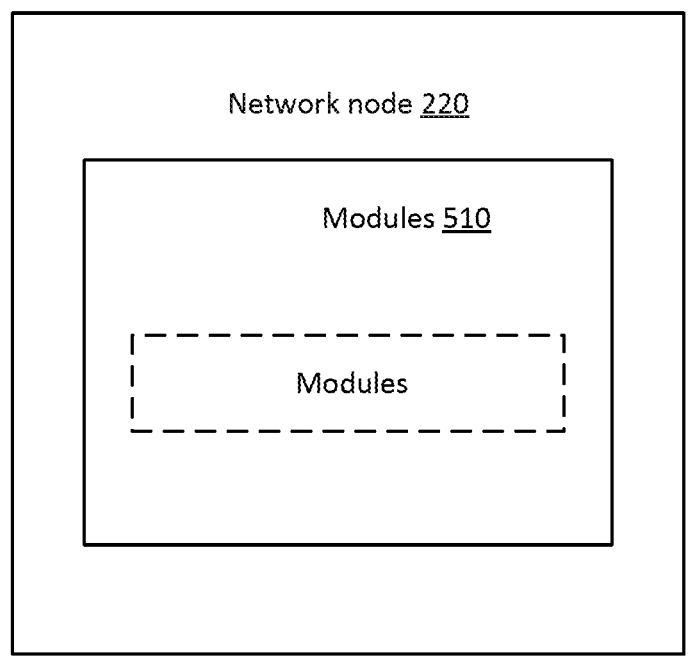

In some embodiments, the network node 220 may comprise a series of modules 510 (see FIG. 20) configured to implement the functionalities of the network node 220 described above. Referring to FIG. 20, in some embodiments, the network node 220 may comprise a receiving module configured to receive, from a wireless device, a request to resume a connection. The network 220 may comprise, for example, a sending module configured to send a resume response message to the wireless device, the message comprising an indication to perform a full configuration. The network node 220 may also comprise a receiving module configured to receive a request to resume a connection from a wireless device. The network node may comprise other modules configured to perform the functionalities of method 300 of FIG. 15 and method 370 of FIG. 18, for example.

It will be appreciated that the various modules may be implemented as combination of hardware and/or software, for instance, the processor, memory and transceiver(s) of radio network node 220 shown in FIG. 19. Some embodiments may also include additional modules to support additional and/or optional functionalities.

In some embodiments, the retrieving module may also be configured to retrieve configuration information for the wireless device; wherein the configuration information is adapted from a source network node to the network node so as to be usable by the network node. In some embodiments, the sending module may also be configured to send a resume response message to the wireless device to resume the connection based on the adapted configuration information.

Figure 21:
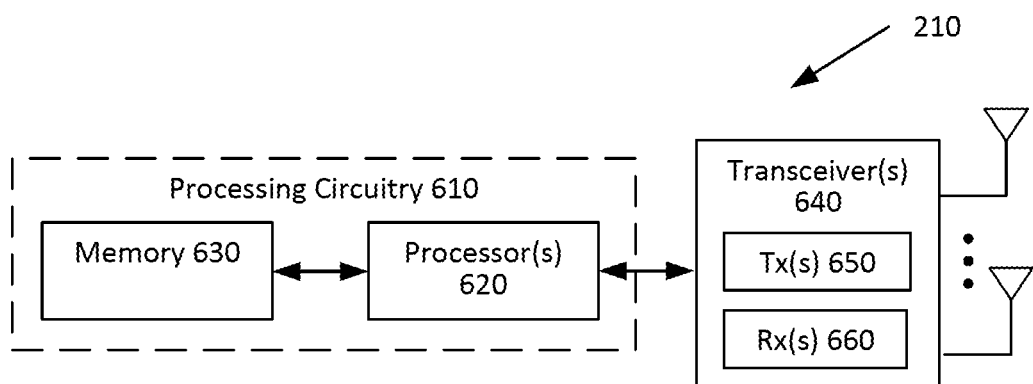
FIGS. 21 and 22 illustrate schematic block diagrams of a wireless device according to some embodiments.

FIG. 21 illustrates a schematic block diagram of a wireless device 210 according to some embodiments of the present disclosure. As illustrated, the wireless device 210 includes circuitry/circuit 610 comprising one or more processors 620 (e.g., Central Processing Units (CPUs), Application Specific Integrated Circuits (ASICs), Field Programmable Gate Arrays (FPGAs), and/or the like) and memory 630. The wireless device 210 also includes one or more transceivers 640 each including one or more transmitter 650 and one or more receivers 660 coupled to one or more antennas 670. In some embodiments, the functionality of the wireless device 210 described above may be fully or partially implemented in software that is, e.g., stored in the memory 630 and executed by the processor(s) 620. For example, the processor 620 is configured to perform any operations related to the UE, e.g. method 350 of FIG. 17.

Figure 17:
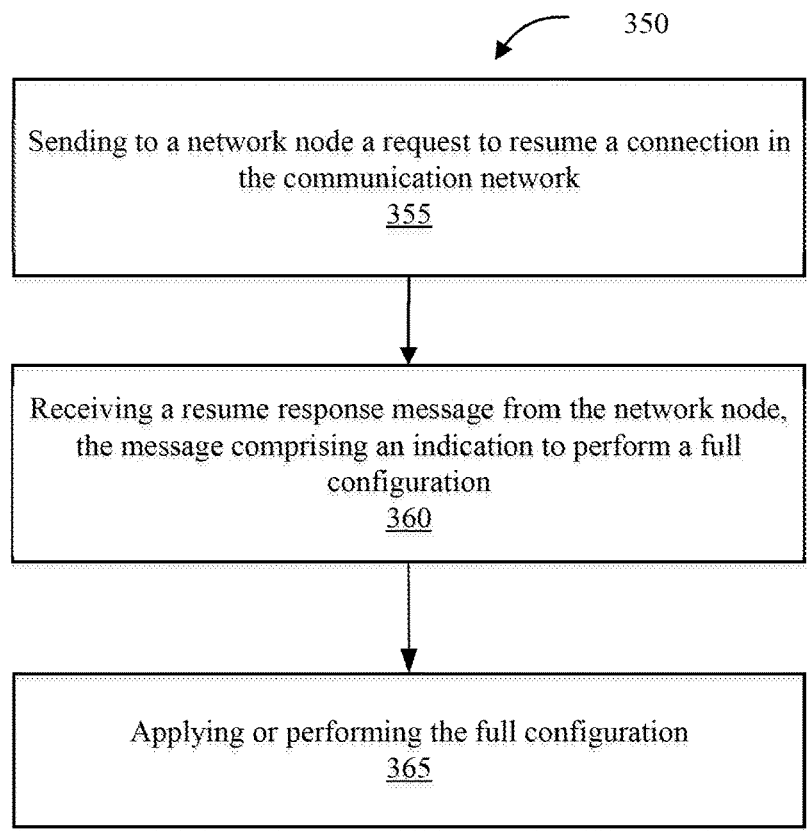
FIG. 17 illustrates a flow chart of a method in a wireless device, according to an embodiment.

In some embodiments, a computer program including instructions which, when executed by the at least one processor 620, causes the at least one processor 620 to carry out the functionality of the wireless device 210 according to any of the embodiments described herein is provided (e.g. any operations related to the UE, e.g. method 350 of FIG. 17). In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 22:
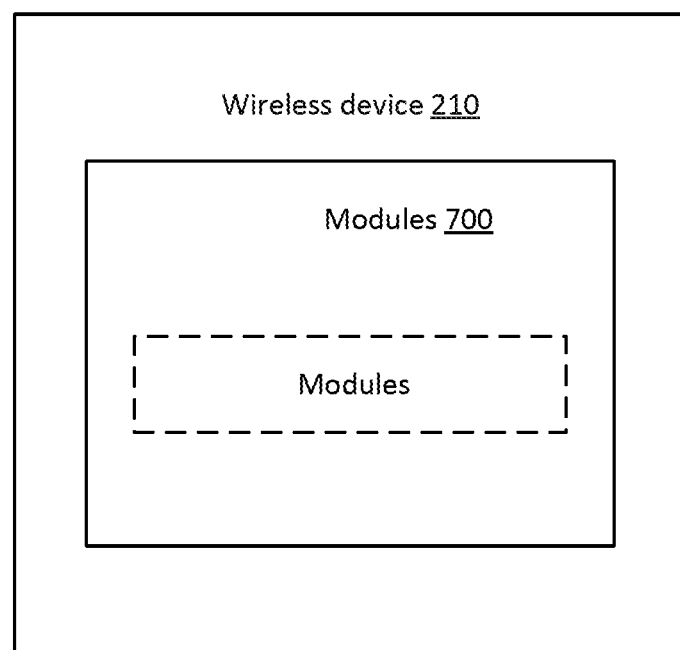

FIG. 22 is a schematic block diagram of the wireless device 210 according to some other embodiments of the present disclosure. The wireless device 210 includes one or more modules 700, each of which is implemented in software. The module(s) 700 provide the functionality of the wireless device 210 described herein. For example, the modules 700 may comprise a sending module operable to perform at least step 355 of FIG. 17, a receiving module operable to perform at least step 360 of FIG. 17 and an applying module operable to perform at least step 365 of FIG. 17.

Embodiments may also be practiced in distributed computing environments where tasks are performed by remote-processing devices that are linked through a communications network.

Figure 23:
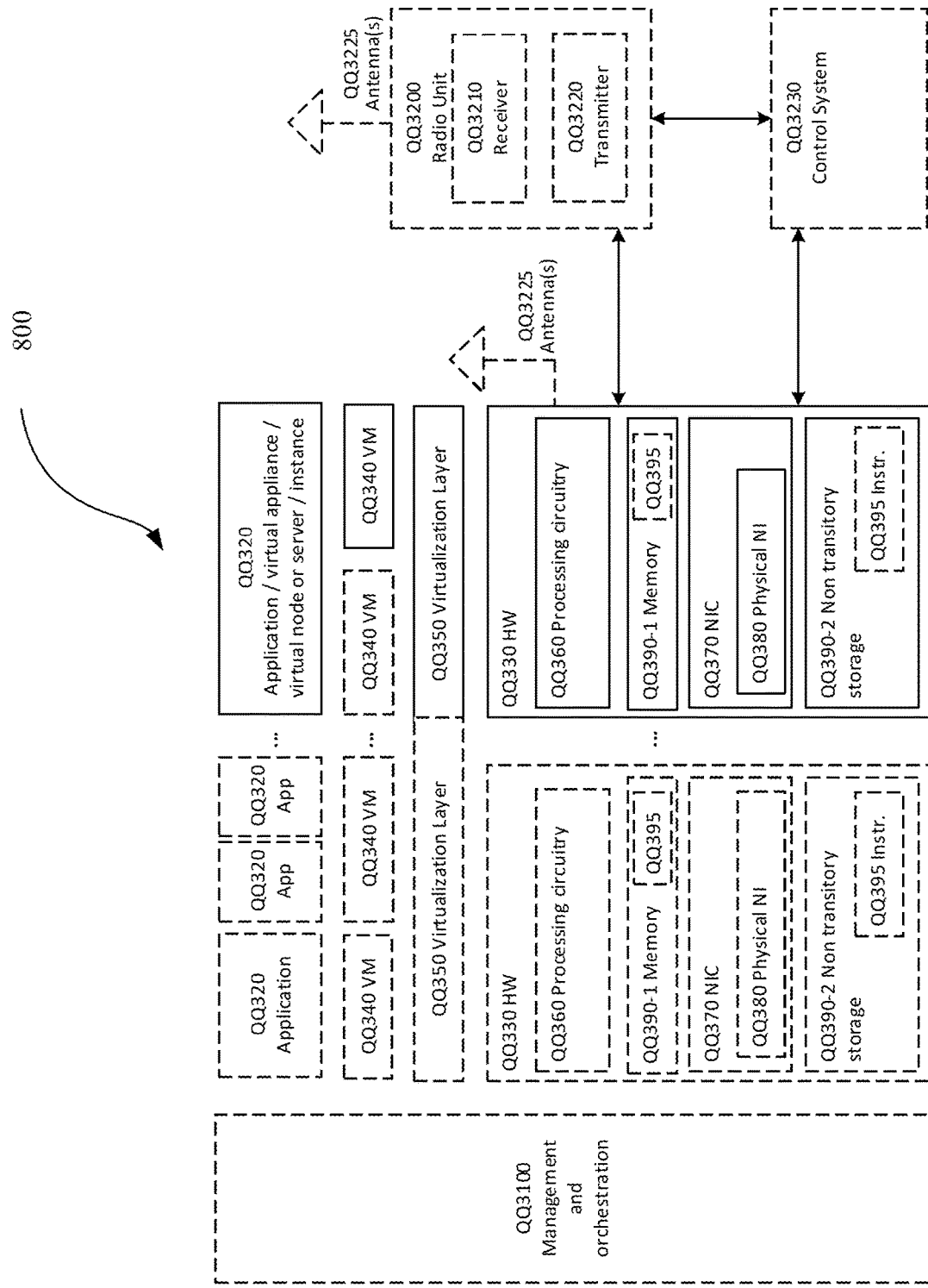
FIG. 23 illustrates a schematic block diagram illustrating a virtualization environment in which functions implemented by some embodiments may be virtualized.

For example, FIG. 23 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a network node 220 (e.g., a virtualized base station or a virtualized radio access node) or to a device 210 (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment 800 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment 800, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in Figure QQ3, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in Figure QQ3.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

What is claimed is:

1. A method in a wireless device, the method comprising:
 sending to a network node a request to resume a connection in a communication network;
 receiving a resume message from the network node, the message comprising an indication to perform a full configuration; and
 applying the full configuration, without receiving a reconfiguration message.

2. The method of claim 1, further comprising discarding an old bearer configuration and old radio parameters.

3. The method of claim 1, further comprising keeping security keys.

4. The method of claim 1, further comprising receiving a configuration.

5. The method of claim 4, further comprising applying the received configuration.

6. A wireless device, comprising a communication interface; and one or more processing circuits communicatively connected to the communication interface, the one or more processing circuits comprising at least one processor and memory, the memory containing instructions that, when executed, cause the at least one processor to:
 send to a network node a request to resume a connection in a communication network;
 receive a resume response message from the network node, the message comprising an indication to perform a full configuration; and
 apply the full configuration, without receiving a reconfiguration message.

7. The wireless device of claim 6, wherein the at least one processor is configured to discard an old bearer configuration and old radio parameters.

8. The wireless device of claim 6, wherein the at least one processor is configured to keep security keys.

9. The wireless device of claim 6, wherein the at least one processor is configured to receive a configuration.

10. The wireless device of claim 9, wherein the at least one processor is configured to apply the received configuration.

11. A network node comprising:
 a communication interface; and
 one or more processing circuits communicatively connected to the communication interface, the one or more processing circuits comprising at least one processors and memory, the memory containing instructions that, when executed, cause the at least one processor to:
 receive, from a wireless device, a request to resume a connection in a communication network;
 send a resume response message to the wireless device, the message comprising an indication to perform a full configuration, without sending a reconfiguration message.

12. The network node of claim 11, wherein the indication comprises a flag.

13. The network node of claim 11, wherein the network node has a different radio access technology than a previous network node which suspended a previous connection for the wireless device.

14. The network node of claim 11, wherein the at least one processor is configured to retrieve configuration information for the wireless device.

15. The network node of claim 11, wherein the message further comprises configuration parameters.

16. The network node of claim 15, wherein the indication comprises an indication to perform a full configuration using the configuration parameters.

17. The network node of claim 15, wherein the at least one processor is configured to generate the configuration parameters by generating a new User Equipment (UE) Access Stratum (AS) context.

18. The network node of claim 15, wherein the at least one processor is configured to generate the configuration parameters based on S1 and Next Generation (NG) context which contains bearer information used during an initial context setup.

19. The network node of claim 15, wherein the configuration parameters comprise one or more of bearer configuration, Packet Data Convergence Protocol (PDCP) configuration and Radio Link Control (RLC) configuration.

20. The network node of claim 11, wherein the resume response message is one of a RRCConnectionResume and a RRCResume.

* * * * *

UNITED STATES PATENT AND TRADEMARK OFFICE
CERTIFICATE OF CORRECTION

PATENT NO. : 10,517,133 B2
APPLICATION NO. : 16/380844
DATED : December 24, 2019
INVENTOR(S) : Teyeb et al.

Page 1 of 1

It is certified that error appears in the above-identified patent and that said Letters Patent is hereby corrected as shown below:

In the Specification

In Column 1, Line 38, delete "SRB1and SRB2have" and insert -- SRB1 and SRB2 have --, therefor.

In Column 1, Line 61, delete "Service (UMTS)" and insert -- System (UMTS) --, therefor.

In Column 2, Lines 6-7, delete "an Master node (MN) or as an Secondary node" and insert -- a Master node (MN) or as a Secondary node --, therefor.

In Column 7, Line 45, delete "5.3.10.2;" and insert -- 5.3.10.2. --, therefor.

In Column 8, Line 56, delete "PDCP" and insert -- PDCP. --, therefor.

In Column 12, Line 26, delete "machine type (MTC)" and insert -- machine type communication (MTC) --, therefor.

In Column 12, Line 28, delete "equipped (LEE)," and insert -- equipment (LEE), --, therefor.

In Column 14, Line 16, delete "305," and insert -- 305: --, therefor.

In Column 18, Line 44, delete "core network node 230)." and insert -- core network node 240). --, therefor.

In the Claims

In Column 23, Line 3, in Claim 18, delete "51" and insert -- S1 --, therefor.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*